United States Patent
Foiles et al.

(10) Patent No.: US 12,190,281 B2
(45) Date of Patent: Jan. 7, 2025

(54) SUPPLY-CHAIN CHARACTERISTIC-VECTORS MERCHANDISING SYSTEM AND METHODS

(71) Applicant: Project Canary, PBC, Denver, CO (US)

(72) Inventors: William J. Foiles, Denver, CO (US); Ryan E. Brush, Denver, CO (US); Nathan C. Eichenlaub, Denver, CO (US); Kieran J. Lynn, Denver, CO (US)

(73) Assignee: Project Canary, PBC, Denver, CO (US)

( * ) Notice: Subject to any disclaimer, the term of this patent is extended or adjusted under 35 U.S.C. 154(b) by 0 days.

(21) Appl. No.: 18/592,011

(22) Filed: Feb. 29, 2024

(65) Prior Publication Data

US 2024/0318789 A1 Sep. 26, 2024

Related U.S. Application Data

(63) Continuation of application No. 18/378,563, filed on Oct. 10, 2023, now Pat. No. 11,946,602, which is a (Continued)

(51) Int. Cl.
*F17D 3/18* (2006.01)
*F17D 3/01* (2006.01)
(Continued)

(52) U.S. Cl.
CPC ........... *G06Q 10/0833* (2013.01); *F17D 3/01* (2013.01); *F17D 3/18* (2013.01); *G06Q 10/063* (2013.01);
(Continued)

(58) Field of Classification Search
CPC .................. F17D 3/01; F17D 3/18; G05B 2219/24215; G06Q 50/00; G06Q 50/06; G06Q 10/063
(Continued)

(56) References Cited

U.S. PATENT DOCUMENTS 7,647,136 B2    1/2010   Mcdowell
7,805,271 B2    9/2010   Nojima et al.
(Continued)

FOREIGN PATENT DOCUMENTS

AU    2007216888 B    4/2011
CN    107782374 A    3/2018
(Continued)

OTHER PUBLICATIONS

U.S. Appl. No. 17/813,585, dated Jul. 19, 2022, Nathan C. Eichenlaub.
(Continued)

*Primary Examiner* — William M McCalister
(74) *Attorney, Agent, or Firm* — Stephen B. Katsaros; Patent Engineering, LLC

(57) ABSTRACT

In some configurations, a supply-chain characteristic-vectors merchandising system and a method for an environmental characteristic-vectors of a gas communicating from an upstream amenity to a downstream amenity in a supply-chain may be disclosed. The system may be configured to track oil and/or gas throughout the supply-chain by associating characteristic-vectors (e.g., environmental, operational, physical etc.) of the upstream amenity and the downstream amenity with the energy units of the gas transmitted through the supply-chain.

25 Claims, 25 Drawing Sheets

Related U.S. Application Data continuation of application No. 18/125,709, filed on Mar. 23, 2023, now Pat. No. 11,790,312.

(51) Int. Cl.
  *G06Q 10/063* (2023.01)
  *G06Q 10/0833* (2023.01)
  *G06Q 50/06* (2024.01)

(52) U.S. Cl.
  CPC .............. *G06Q 50/06* (2013.01); *G05B 2219/24215* (2013.01)

(58) Field of Classification Search
  USPC ......................................................... 700/282
  See application file for complete search history.

(56) References Cited

U.S. PATENT DOCUMENTS

| | | | |
|---|---|---|---|
| 7,949,615 | B2 | 5/2011 | Ehlers et al. |
| 8,197,752 | B2 | 6/2012 | Nojima et al. |
| 8,275,719 | B1 | 9/2012 | Agnew et al. |
| 8,341,106 | B1 | 12/2012 | Scolnicov et al. |
| 8,346,635 | B1 | 1/2013 | Olim |
| 8,600,568 | B2 | 12/2013 | Smaidris |
| 9,202,198 | B2 | 12/2015 | Margonis et al. |
| 9,298,925 | B1 | 3/2016 | Crittall et al. |
| 9,430,644 | B2 | 8/2016 | Gonzalez et al. |
| 9,915,399 | B1 | 3/2018 | Latshaw et al. |
| 10,055,966 | B2 | 8/2018 | Foster et al. |
| 10,190,976 | B2 | 1/2019 | Waxman et al. |
| 10,254,220 | B2 | 4/2019 | Alkadi et al. |
| 10,623,832 | B2 | 4/2020 | Weatherhead et al. |
| 10,816,520 | B2 | 10/2020 | Kasten et al. |
| 10,852,715 | B2 | 12/2020 | Birchbauer et al. |
| 11,132,752 | B2 | 9/2021 | Finkel et al. |
| 11,774,426 | B1 | 9/2023 | Eichenlaub et al. |
| 2002/0153134 | A1 | 10/2002 | Newman |
| 2004/0078153 | A1* | 4/2004 | Bartone ............ H02J 13/00002 702/57 |
| 2006/0020544 | A1* | 1/2006 | Kaveski ................. G06Q 30/02 705/40 |
| 2007/0289635 | A1 | 12/2007 | Ghazarian et al. |
| 2008/0082215 | A1* | 4/2008 | McDowell ................ F17D 3/01 700/282 |
| 2008/0103993 | A1* | 5/2008 | Wilson ................... G06Q 50/06 705/412 |
| 2008/0177678 | A1* | 7/2008 | Di Martini ............. G06Q 10/06 705/412 |
| 2008/0278708 | A1 | 11/2008 | Vaidya et al. |
| 2009/0089075 | A1 | 4/2009 | Noujima et al. |
| 2014/0058775 | A1 | 2/2014 | Siig et al. |
| 2015/0369013 | A1 | 12/2015 | Weatherhead et al. |
| 2016/0212508 | A1 | 7/2016 | Guglielmo et al. |
| 2016/0214715 | A1 | 7/2016 | Meffert |
| 2016/0232612 | A1 | 8/2016 | Spalenka et al. |
| 2017/0154509 | A1 | 6/2017 | Prabhakar et al. |
| 2018/0266944 | A1 | 9/2018 | Waxman et al. |
| 2018/0283169 | A1 | 10/2018 | Oguche et al. |
| 2019/0324435 | A1 | 10/2019 | Cella et al. |
| 2019/0360924 | A1 | 11/2019 | Macrelli et al. |
| 2020/0005236 | A1 | 1/2020 | Borgerson et al. |
| 2022/0107189 | A1 | 4/2022 | Leen et al. |
| 2023/0304981 | A1 | 7/2022 | Eichenlaub et al. |
| 2022/0277261 | A1 | 9/2022 | Stollman et al. |
| 2023/0176023 | A1 | 6/2023 | Wang et al. |

FOREIGN PATENT DOCUMENTS

| | | |
|---|---|---|
| CN | 109521162 A | 3/2019 |
| GB | 2525573 A | 11/2015 |
| OA | 17633 A | 5/2017 |
| WO | 2011013803 A1 | 2/2011 |
| WO | 2015079221 A2 | 6/2015 |

OTHER PUBLICATIONS

U.S. Appl. No. 17/813,603, dated Jul. 19, 2022, Nathan C. Eichenlaub.
U.S. Appl. No. 63/323,703, dated Mar. 25, 2022, Nathan C. Eichenlaub.
International Search Report and Written Opinion for International Application No. PCT/US2021/049702, dated Feb. 7, 2022, 4 pages.

\* cited by examiner

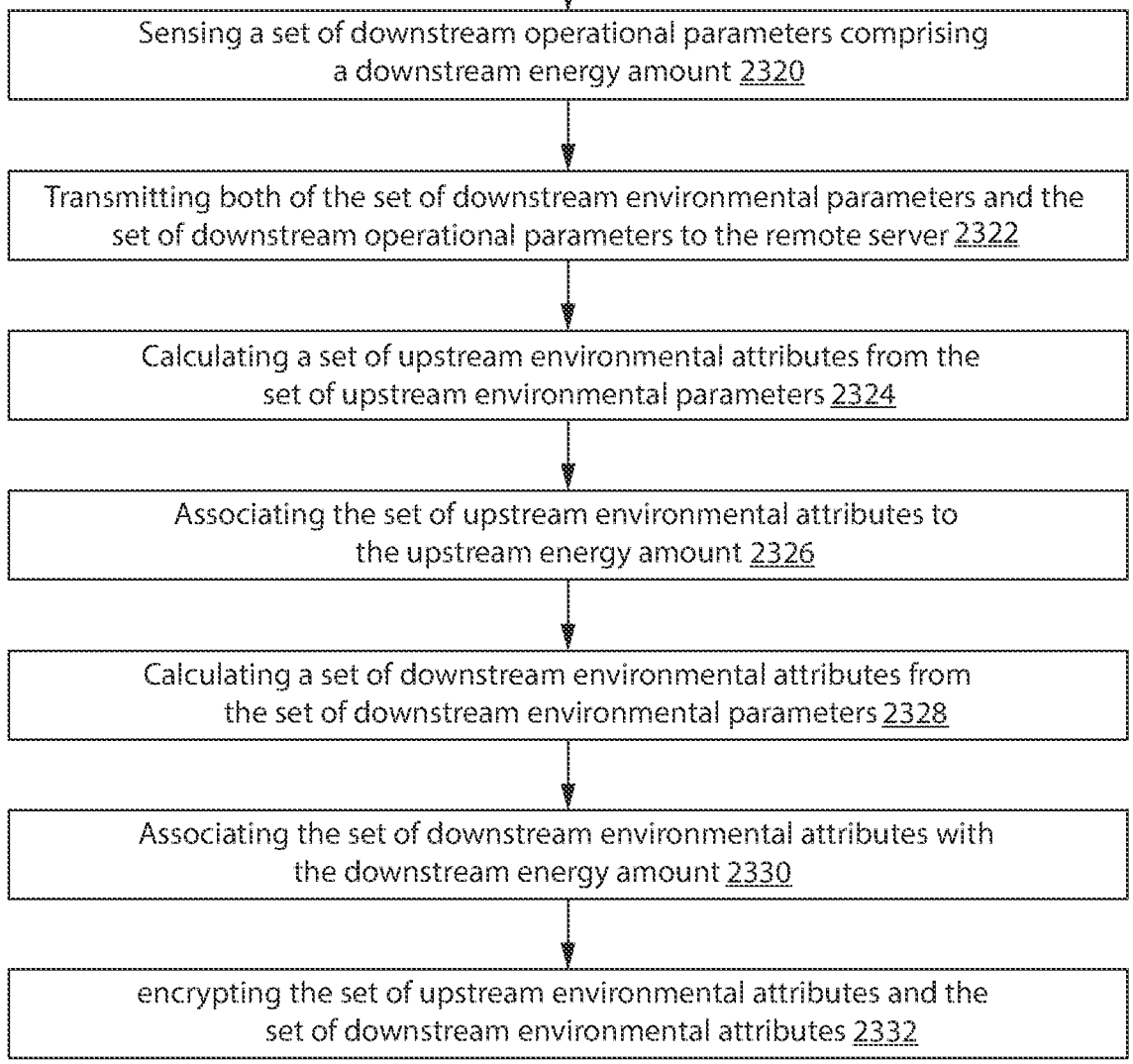

Sensing a set of downstream operational parameters comprising
a downstream energy amount 2520

↓

Transmitting both of the set of downstream environmental parameters and the
set of downstream operational parameters to the remote server 2522

↓

Calculating a set of upstream environmental attributes from the
set of upstream environmental parameters 2524

↓

Associating the set of upstream environmental attributes to
the upstream energy amount 2526

↓

Calculating a set of downstream environmental attributes from
the set of downstream environmental parameters 2528

↓

Associating the set of downstream environmental attributes with
the downstream energy amount 2530

↓

Training an environmental-attributes-machine-learning-model to generate
an environmental-attributes-machine-learning-model parameter 2532

↓

Generating an environmental-attribute-simulation-model to a simulated
environmental attribute of the upstream amenity and a simulated
environmental attribute downstream amenity 2534

↓

Minimizing the set of upstream environmental attributes and
the set of downstream environmental attributes 2536

FIG. 25B

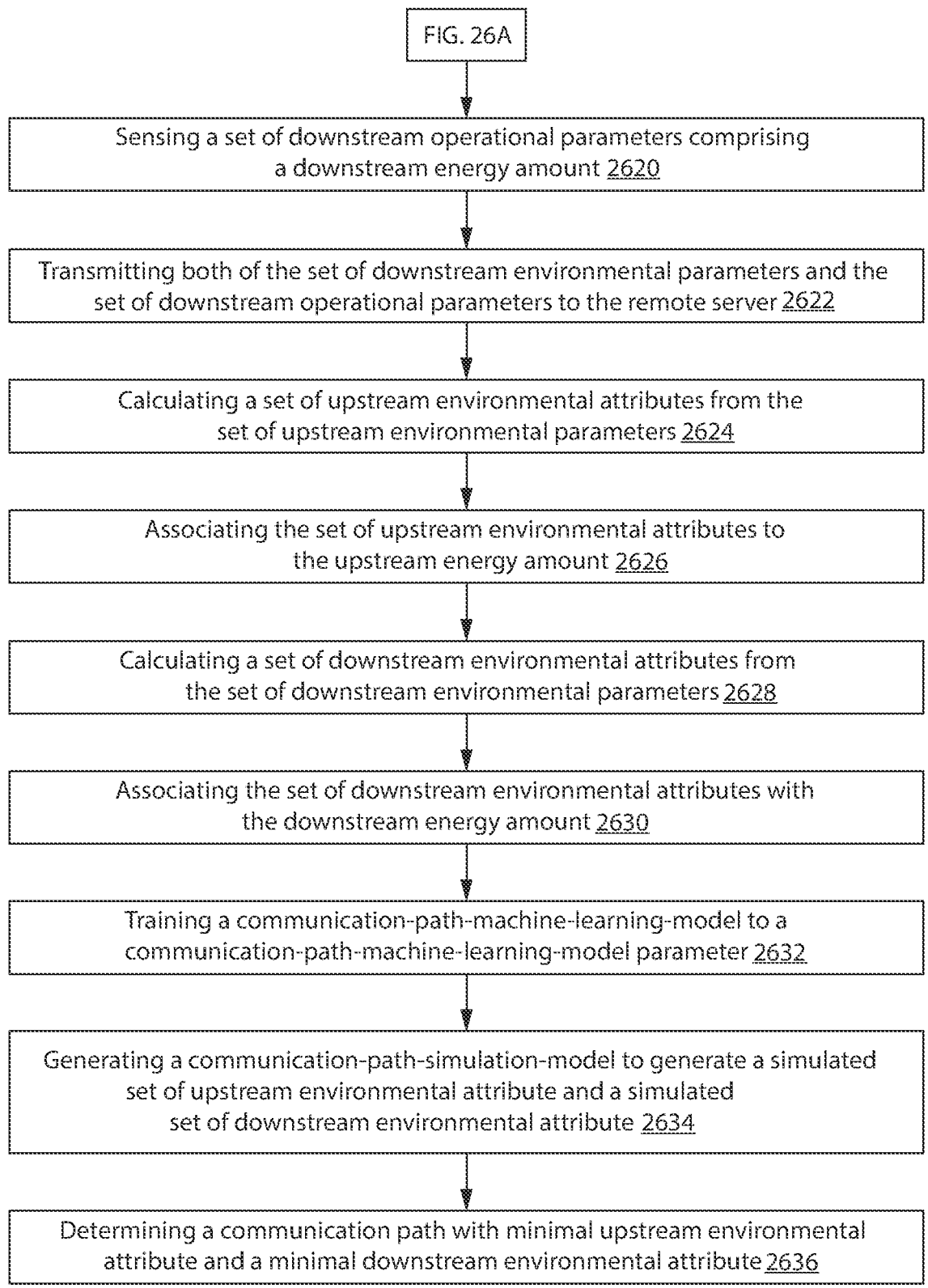

SUPPLY-CHAIN CHARACTERISTIC-VECTORS MERCHANDISING SYSTEM AND METHODS

CROSS REFERENCE TO RELATED APPLICATIONS

This application is a continuation of an allowed U.S. patent application Ser. No. 18/378,563, filed on Oct. 10, 2023, entitled "SUPPLY-CHAIN CHARACTERISTIC-VECTORS MERCHANDISING SYSTEM AND METHODS", which is a continuation of a U.S. patent application Ser. No. 18/125,709, filed on Mar. 23, 2023, entitled "SUPPLY-CHAIN CHARACTERISTIC-VECTORS MERCHANDISING SYSTEM AND METHODS", issued on Oct. 17, 2023 as U.S. Pat. No. 11,790,312, which is related to issued U.S. patent application Ser. No. 17/813,585, filed on Jul. 19, 2022, entitled "EMISSIONS DETECTION SYSTEM AND METHODS" (now U.S. Pat. No. 11,802,860 issued on Oct. 31, 2023), a second issued U.S. patent application Ser. No. 17/813,602, filed on Jul. 19, 2022, entitled "EMISSIONS DETECTION SYSTEM AND METHODS" (now U.S. Pat. No. 11,774,426 issued on Oct. 3, 2023), and both these applications claim the benefit of U.S. Provisional Patent Application Ser. No. 63/323,703, filed on Mar. 25, 2022, entitled "EMISSIONS DETECTION SYSTEM AND METHODS." All of the above applications are hereby expressly incorporated by reference in their entirety for all purposes.

TECHNICAL FIELD

This disclosure pertains generally, but not by way of limitation, to systems and methods for merchant thermal, environmental, combustion flow processes in motive and fluid supply-chain. More particularly, this disclosure relates to merchant characteristic-vectors in an oil-and-gas supply-chain.

BACKGROUND

A supply-chain in a market is a network of individuals, organizations, resources, activities, and technology, in which raw materials are converted to finished products delivered to a customer. As the market scales, gaps exist in visibility across the supply-chain. Therefore, it is critical to standardize how commodities are tracked throughout the supply-chain to maintain transparency and integrity in the market.

SUMMARY

In one configuration, a supply-chain characteristic-vectors merchant method for an environmental characteristic-vectors of a gas communicating from an upstream amenity to a downstream amenity may be disclosed. The supply-chain characteristic-vectors merchant method may include a first step of providing an upstream air quality monitor at the upstream amenity, and the upstream air quality monitor may further include a first sensor responsive to a target substance. The method may include the next step of sensing a set of upstream environmental parameters with the upstream air quality monitor. The method may include the next step of providing an upstream supervisory-control-and-data-acquisition system at the upstream amenity. The method may include the next step of sensing a set of upstream operational parameters with the upstream supervisory-control-and-data-acquisition system, the set of upstream operational parameters may include an upstream energy amount. The method may include the next step of transmitting both the set of upstream environmental parameters and the set of upstream operational parameters to a remote server. The method may include the next step of providing a downstream air quality monitor at the downstream amenity, the downstream air quality monitor may further include a second sensor responsive to the target substance. The method may include the next step of communicating the gas from the upstream amenity to the downstream amenity. The method may include the next step of sensing a set of downstream environmental parameters with the downstream air quality monitor; providing a downstream supervisory-control-and-data-acquisition system at the downstream amenity. The method may include the next step of sensing a set of downstream operational parameters with the downstream supervisory-control-and-data-acquisition system, the set of downstream operational parameters may further include a downstream energy amount. The method may include the next step of transmitting both the set of downstream environmental parameters and the set of downstream operational parameters to the remote server. The method may include the next step of calculating a set of upstream environmental characteristic-vectors from the set of upstream environmental parameters. The method may include the next step of associating the set of upstream environmental characteristic-vectors to the upstream energy amount; calculating a set of downstream environmental characteristic-vectors from the set of downstream environmental parameters. The method may include the next step of associating the set of downstream environmental characteristic-vectors with the downstream energy amount. The method may include the next step of confirming presence of the upstream energy amount at the downstream amenity. The method may include the next step of merchant the downstream energy amount with the upstream energy amount and the set of upstream environmental characteristic-vectors associated therewith.

In another configuration, a supply-chain characteristic-vectors merchant system for an environmental characteristic-vectors of a gas communicating from an upstream amenity to a downstream amenity may be disclosed. The supply-chain characteristic-vectors merchant system may include an upstream air quality monitor at the upstream amenity, and the upstream air quality monitor may further include a first sensor responsive to a target substance. The upstream air quality monitor may be configured to sense a set of upstream environmental parameters. The system may further include an upstream supervisory-control-and-data-acquisition system installed at the upstream amenity and may be configured to sense a set of upstream operational parameters, the set of upstream operational parameters may include an upstream energy amount, and the upstream supervisory-control-and-data-acquisition system may be configured to transmit both the set of upstream environmental parameters and the set of upstream operational parameters to a remote server. Further, the system may include a downstream air quality monitor installed at the downstream amenity, and the downstream air quality monitor may further include a second sensor responsive to the target substance and configured to sense a set of downstream environmental parameters. The system may further include a downstream supervisory-control-and-data-acquisition system installed at the downstream amenity configured to sense a set of downstream operational parameters, and the set of downstream operational parameters may include a downstream energy amount. The downstream supervisory-control-and-data-acquisition system may be configured to transmit both the set of downstream environmental parameters and the set of downstream operational parameters to the remote server. The system may include a processing unit connected to the remote server, configured to calculate a set of upstream environmental characteristic-vectors from the set of upstream environmental parameters and associate the set of upstream environmental characteristic-vectors to the upstream energy amount. The processing unit may further calculate a set of downstream environmental characteristic-vectors from the set of downstream environmental parameters, and associate the set of downstream environmental characteristic-vectors with the downstream energy amount. The processing unit may further be configured to confirm presence of the upstream energy amount at the downstream amenity and transfer the downstream energy amount with the upstream energy amount and the set of upstream environmental characteristic-vectors associated therewith.

In one configuration, a supply-chain characteristic-vectors securing method for securing environmental characteristic-vectors of a gas communicating from an upstream amenity to a downstream amenity may be disclosed. The method may include a first step of providing an upstream air quality monitor at the upstream amenity, the upstream air quality monitor may further include a first sensor responsive to a target substance. The method may include the next step of sensing a set of upstream environmental parameters with the upstream air quality monitor. The method may include the next step of providing an upstream supervisory-control-and-data-acquisition system at the upstream amenity. The method may include the next step of sensing a set of upstream operational parameters with the upstream supervisory-control-and-data-acquisition system, the set of upstream operational parameters may include an upstream energy amount. The method may include the next step of transmitting both the set of upstream environmental parameters and the set of upstream operational parameters to a remote server. The method may include the next step of providing a downstream air quality monitor at the downstream amenity, the downstream air quality monitor may further include a second sensor responsive to the target substance. The method may include the next step of communicating the gas from the upstream amenity to the downstream amenity. The method may include the next step of sensing a set of downstream environmental parameters with the downstream air quality monitor; providing a downstream supervisory-control-and-data-acquisition system at the downstream amenity. The method may include the next step of sensing a set of downstream operational parameters with the downstream supervisory-control-and-data-acquisition system, the set of downstream operational parameters may further include a downstream energy amount. The method may include the next step of transmitting both the set of downstream environmental parameters and the set of downstream operational parameters to the remote server. The method may include the next step of calculating a set of upstream environmental characteristic-vectors from the set of upstream environmental parameters. The method may include the next step of associating the set of upstream environmental characteristic-vectors to the upstream energy amount; calculating a set of downstream environmental characteristic-vectors from the set of downstream environmental parameters. The method may include the next step of associating the set of downstream environmental characteristic-vectors with the downstream energy amount. Further, the method may include securing the set of upstream environmental characteristic-vectors and the set of downstream environmental characteristic-vectors.

In another configuration, a supply-chain characteristic-vectors encrypting system for an environmental characteristic-vectors of a gas communicating from an upstream amenity to a downstream amenity may be disclosed. The supply-chain characteristic-vectors encrypting system may include an upstream air quality monitor at the upstream amenity, and the upstream air quality monitor may further include a first sensor responsive to a target substance. The upstream air quality monitor may be configured to sense a set of upstream environmental parameters. The system may further include an upstream supervisory-control-and-data-acquisition system installed at the upstream amenity, and may be configured to sense a set of upstream operational parameters, the set of upstream operational parameters may include an upstream energy amount, and the upstream supervisory-control-and-data-acquisition system may be configured to transmit both the set of upstream environmental parameters and the set of upstream operational parameters to a remote server. Further, the system may include a downstream air quality monitor installed at the downstream amenity, and the downstream air quality monitor may further include a second sensor responsive to the target substance and configured to sense a set of downstream environmental parameters. The system may further include a downstream supervisory-control-and-data-acquisition system installed at the downstream amenity configured to sense a set of downstream operational parameters, and the set of downstream operational parameters may include a downstream energy amount. The downstream supervisory-control-and-data-acquisition system may be configured to transmit both the set of downstream environmental parameters and the set of downstream operational parameters to the remote server. The system may include a processing unit connected to the remote server, configured to calculate a set of upstream environmental characteristic-vectors from the set of upstream environmental parameters and associate the set of upstream environmental characteristic-vectors to the upstream energy amount. The processing unit may further calculate a set of downstream environmental characteristic-vectors from the set of downstream environmental parameters, and associate the set of downstream environmental characteristic-vectors with the downstream energy amount. The processing unit may further be configured to confirm presence of the upstream energy amount at the downstream amenity and secure the set of upstream environmental characteristic-vectors and the set of downstream environmental characteristic-vectors.

In one configuration, disclosed is a supply-chain characteristic-vectors minimizing method for minimizing environmental characteristic-vectors of a gas communicating from an upstream amenity to a downstream amenity, the supply-chain characteristic-vectors minimizing may include a first step of providing an upstream air quality monitor at the upstream amenity, the upstream air quality monitor may further include a first sensor responsive to a target substance. The method may include the next step of sensing a set of upstream environmental parameters with the upstream air quality monitor. The method may include the next step of providing an upstream supervisory-control-and-data-acquisition system at the upstream amenity. The method may include the next step of sensing a set of upstream operational parameters with the upstream supervisory-control-and-data-acquisition system, the set of upstream operational parameters may include an upstream energy amount. The method may include the next step of transmitting both the set of upstream environmental parameters and the set of upstream operational parameters to a remote server. The method may include the next step of providing a downstream air quality monitor at the downstream amenity, the downstream air quality monitor may further include a second sensor responsive to the target substance. The method may include the next step of communicating the gas from the upstream amenity to the downstream amenity. The method may include the next step of sensing a set of downstream environmental parameters with the downstream air quality monitor. The method may include the next step of providing a downstream supervisory-control-and-data-acquisition system at the downstream amenity. The method may include the next step of sensing a set of downstream operational parameters with the downstream supervisory-control-and-data-acquisition system, the set of downstream operational parameters may further include a downstream energy amount. The method may include the next step of transmitting both the set of downstream environmental parameters and the set of downstream operational parameters to the remote server. The method may include the next step of calculating a set of upstream environmental characteristic-vectors from the set of upstream environmental parameters. The method may include the next step of associating the set of upstream environmental characteristic-vectors to the upstream energy amount; calculating a set of downstream environmental characteristic-vectors from the set of downstream environmental parameters. The method may include the next step of associating the set of downstream environmental characteristic-vectors with the downstream energy amount. The method may include the next step of training an environmental-characteristic-vectors-minimizing-machine-learning-model, and the environmental-characteristic-vectors-minimizing-machine-learning-model may be configured to generate an environmental-characteristic-vectors-minimizing-machine-learning-model parameter for the upstream amenity and the downstream amenity. The method may further include generating an environmental-characteristic-vectors-minimizing-simulation-model of the set of upstream environmental characteristic-vectors and the set of downstream environmental characteristic-vectors using the environmental-characteristic-vectors-minimizing-machine-learning-model parameter. The environmental-characteristic-vectors-minimizing-simulation-model may be configured to generate simulated environmental characteristic-vectors of the upstream amenity and simulated environmental characteristic-vectors downstream amenity. The method may include the next step minimizing the set of upstream environmental characteristic-vectors and the set of downstream environmental characteristic-vectors, by analyzing the simulated environmental characteristic-vectors of the upstream amenity and the simulated environmental characteristic-vectors downstream amenity.

In another configuration, disclosed is a supply-chain characteristic-vectors minimizing system for an environmental characteristic-vectors of a gas communicating from an upstream amenity to a downstream amenity, the supply-chain characteristic-vectors minimizing system may include an upstream air quality monitor at the upstream amenity, the upstream air quality monitor may further include a first sensor responsive to a target substance. The upstream air quality monitor may be configured to sense a set of upstream environmental parameters. The system may further include an upstream supervisory-control-and-data-acquisition system installed at the upstream amenity and may be configured to sense a set of upstream operational parameters, the set of upstream operational parameters may include an upstream energy amount, and the upstream supervisory-control-and-data-acquisition system may be configured to transmit both the set of upstream environmental parameters and the set of upstream operational parameters to a remote server. Further, the system may include a downstream air quality monitor installed at the downstream amenity, and the downstream air quality monitor may further include a second sensor responsive to the target substance and configured to sense a set of downstream environmental parameters. The system may further include a downstream supervisory-control-and-data-acquisition system installed at the downstream amenity configured to sense a set of downstream operational parameters, and the set of downstream operational parameters may include a downstream energy amount. The downstream supervisory-control-and-data-acquisition system may be configured to transmit both the set of downstream environmental parameters and the set of downstream operational parameters to the remote server. The system may include a processing unit connected to the remote server, configured to calculate a set of upstream environmental characteristic-vectors from the set of upstream environmental parameters and associate the set of upstream environmental characteristic-vectors to the upstream energy amount. The processing unit may further calculate a set of downstream environmental characteristic-vectors from the set of downstream environmental parameters, and associate the set of downstream environmental characteristic-vectors with the downstream energy amount. The processing unit may further be configured to confirm presence of the upstream energy amount at the downstream amenity. The processing unit may be configured to train an environmental-characteristic-vectors-minimizing-machine-learning-model, wherein the environmental-characteristic-vectors-minimizing-machine-learning-model may be configured to generate an environmental-characteristic-vectors-minimizing-machine-learning-model parameter for the upstream amenity and the downstream amenity and generate an environmental-characteristic-vectors-minimizing-simulation-model of the set of upstream environmental characteristic-vectors and the set of downstream environmental characteristic-vectors using the environmental-characteristic-vectors-minimizing-machine-learning-model parameter. The environmental-characteristic-vectors-minimizing-simulation-model may be configured to generate simulated environmental characteristic-vectors of the upstream amenity and simulated environmental characteristic-vectors downstream amenity. Based on the simulated environmental characteristic-vectors of the upstream amenity and the simulated environmental characteristic-vectors downstream amenity, the set of upstream environmental characteristic-vectors, and the set of downstream environmental characteristic-vectors, by analyzing the simulated environmental characteristic-vectors of the upstream amenity and the simulated environmental characteristic-vectors downstream amenity may be minimized.

In one configuration, a supply-chain communication path determining method for a gas communicating from an upstream amenity to a downstream amenity may be disclosed. The supply-chain communication path determining method may include a first step of providing an upstream air quality monitor at the upstream amenity, the upstream air quality monitor may further include a first sensor responsive to a target substance. The method may include the next step of sensing a set of upstream environmental parameters with the upstream air quality monitor. The method may include the next step of providing an upstream supervisory-control-and-data-acquisition system at the upstream amenity. The method may include the next step of sensing a set of upstream operational parameters with the upstream supervisory-control-and-data-acquisition system, the set of upstream operational parameters may include an upstream energy amount. The method may include the next step of transmitting both the set of upstream environmental parameters and the set of upstream operational parameters to a remote server. The method may include the next step of providing a downstream air quality monitor at the downstream amenity, the downstream air quality monitor may further include a second sensor responsive to the target substance. The method may include the next step of communicating the gas from the upstream amenity to the downstream amenity. The method may include the next step of sensing a set of downstream environmental parameters with the downstream air quality monitor; providing a downstream supervisory-control-and-data-acquisition system at the downstream amenity. The method may include the next step of sensing a set of downstream operational parameters with the downstream supervisory-control-and-data-acquisition system, the set of downstream operational parameters may further include a downstream energy amount. The method may include the next step of transmitting both the set of downstream environmental parameters and the set of downstream operational parameters to the remote server. The method may include the next step of calculating a set of upstream environmental characteristic-vectors from the set of upstream environmental parameters. The method may include the next step of associating the set of upstream environmental characteristic-vectors to the upstream energy amount; calculating a set of downstream environmental characteristic-vectors from the set of downstream environmental parameters. The method may include the next step of associating the set of downstream environmental characteristic-vectors with the downstream energy amount. The method may further include the next step of training a communication-path-machine-learning-model, configured to generate a communication-path-machine-learning-model parameter for the upstream amenity and the downstream amenity. method may further include the next step of generating a communication-path-simulation-model of the set of upstream environmental characteristic-vectors and the set of downstream environmental characteristic-vectors using the communication-path-machine-learning-model parameter, configured to generate a simulated set of upstream environmental characteristic-vectors and a simulated set of the downstream environmental characteristic-vectors. The method may further include the next step of determining a communication path with minimal upstream environmental characteristic-vectors and minimal downstream environmental characteristic-vectors, by analyzing the simulated set of upstream environmental characteristic-vectors and the simulated set of the downstream environmental characteristic-vectors.

In another configuration, a supply-chain communication path determining system for a gas communicating from an upstream amenity to a downstream amenity may be disclosed. The system may include an upstream air quality monitor at the upstream amenity, and the upstream air quality monitor may further include a first sensor responsive to a target substance. The upstream air quality monitor may be configured to sense a set of upstream environmental parameters. The system may further include an upstream supervisory-control-and-data-acquisition system installed at the upstream amenity and may be configured to sense a set of upstream operational parameters, the set of upstream operational parameters may include an upstream energy amount, and the upstream supervisory-control-and-data-acquisition system may be configured to transmit both the set of upstream environmental parameters and the set of upstream operational parameters to a remote server. Further, the system may include a downstream air quality monitor installed at the downstream amenity, and the downstream air quality monitor may further include a second sensor responsive to the target substance and configured to sense a set of downstream environmental parameters. The system may further include a downstream supervisory-control-and-data-acquisition system installed at the downstream amenity configured to sense a set of downstream operational parameters, and the set of downstream operational parameters may include a downstream energy amount. The downstream supervisory-control-and-data-acquisition system may be configured to transmit both the set of downstream environmental parameters and the set of downstream operational parameters to the remote server. The system may include a processing unit connected to the remote server, configured to calculate a set of upstream environmental characteristic-vectors from the set of upstream environmental parameters and associate the set of upstream environmental characteristic-vectors to the upstream energy amount. The processing unit may further calculate a set of downstream environmental characteristic-vectors from the set of downstream environmental parameters, and associate the set of downstream environmental characteristic-vectors with the downstream energy amount. The processing unit may further be configured to confirm presence of the upstream energy amount at the downstream amenity. Further, the processing unit may be configured to train a communication-path-machine-learning-model, configured to generate a communication-path-machine-learning-model parameter for the upstream amenity and the downstream amenity and generate a communication-path-simulation-model of the set of upstream environmental characteristic-vectors and the set of downstream environmental characteristic-vectors using the communication-path-machine-learning-model parameter. The communication-path-simulation-model may be configured to generate a simulated set of upstream environmental characteristic-vectors and a simulated set of downstream environmental characteristic-vectors and determine a communication path with minimal upstream environmental characteristic-vectors and a minimal downstream environmental characteristic-vectors, by analyzing the simulated set of upstream environmental characteristic-vectors and the simulated set of downstream environmental characteristic-vectors.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and the various ways in which it is practiced. The following figures of the drawing include:

FIG. 23A-23B illustrates a flow chart of a supply-chain characteristic-vectors encrypting method for an environmental characteristic-vectors of the gas communicating from an upstream amenity to a downstream amenity;

FIG. 25A-25B illustrates a flow chart of a supply-chain characteristic-vectors minimizing method for minimizing environmental characteristic-vectors of the gas communicating from an upstream amenity to a downstream amenity; and FIG. 26A-26B illustrates a communication path determination method for a gas communicating from an upstream amenity to a downstream amenity.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

It should be noted that the following description is related to characteristic-vectors merchant in a supply-chain. As mentioned earlier, the supply-chain in a market is a network of individuals, organizations, resources, activities, and technology, in which raw materials are converted to finished products delivered to a customer. However, the growth of the market has led to an increase in the visibility of gaps in the supply-chain. For example, digital commodities such as sensor data generated with or without operator intervention, for reporting of a regulation-mandated emission inventory, may be missed, or may not be reported, thereby creating a gap in tracking emissions between components involved in the supply-chain. Therefore, it is necessary to track the flow of commodities, to ensure integrity in the supply-chain.

Figure 1:
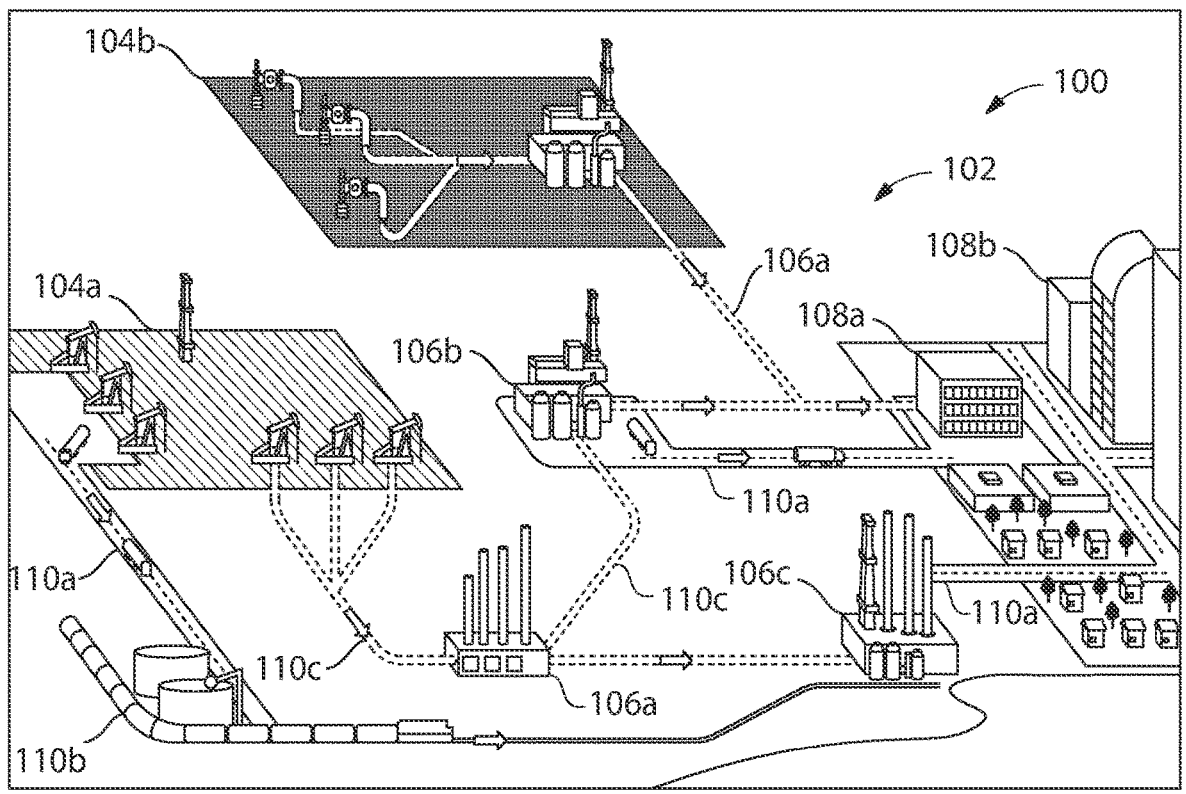
FIG. 1 illustrates a schematic view of an oil and gas supply-chain.

A supply-chain characteristic-vectors method, and a supply-chain characteristic-vectors merchandising system are disclosed. Referring to FIG. 1 illustrating a schematic view 100 of an oil and gas supply-chain 102. The oil and gas supply-chain 102 may include at least one upstream amenity, such as crude oil producing facility 104a, and a natural gas facility 104b (hereinafter collectively referred to as upstream amenity 104), a midstream amenity, such as an oil processing plant 106a, a natural gas processing plant 106b, a refinery 106c (hereinafter collectively referred to as midstream amenity 106), and a downstream amenity such as a gas storage facility 108a, or a households 108b (hereinafter collectively referred to as downstream amenity 108 and a facility may be referred to as an amenity site).

The upstream amenity 104, the midstream amenity 106, and the downstream amenity 108 may be physically interconnected using at least one communication pathways, such as a road transport network 110a, a rail transport network 110b, and a pipeline network 110c (hereinafter collectively referred to as communication pathways 110). For example, with continued reference to FIG. 1, the crude oil producing facility 104a may be connected to the oil processing plant 106a by pipeline network 110c, and further connected to the natural gas processing plant 106b using another branch of the pipeline network 110c. Similarly, the natural gas processing plant 106b may be connected to the gas storage facility 108a via the road transport network 110a.

Figure 2:
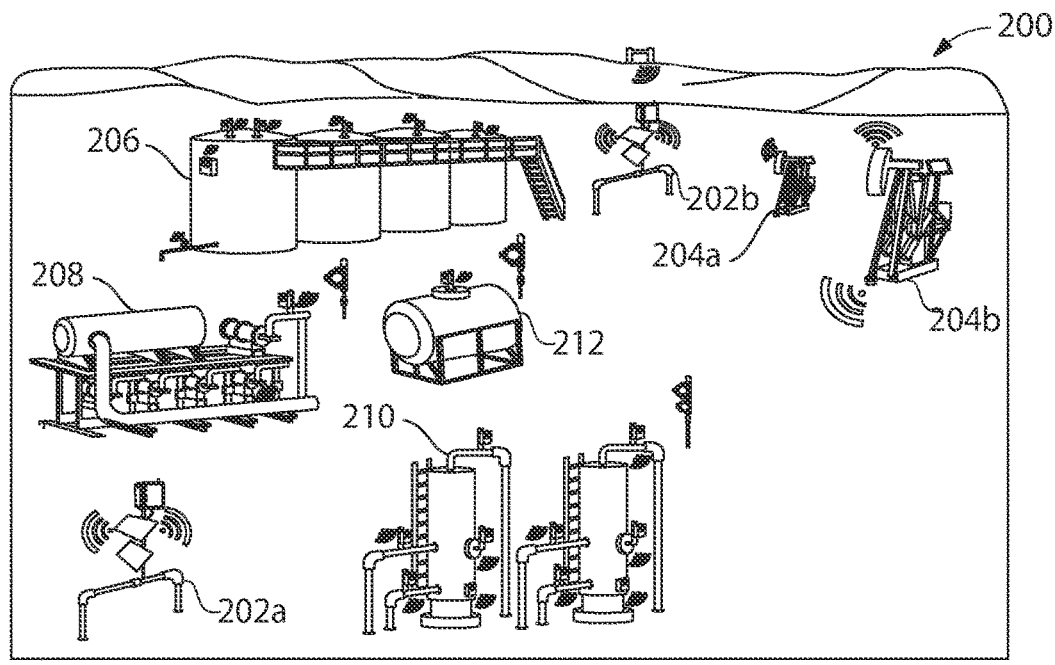
FIG. 2 illustrates an exemplary layout of the upstream amenity in the oil and gas supply-chain of FIG. 1.

Referring now to FIG. 2 illustrating an exemplary layout 200 of the upstream amenity 104. The upstream amenity 104 may include at least one air quality monitors 202a, 202b (hereinafter collectively referred to as air quality monitor 202), at least one pumpjack 204a, 204b (hereinafter collectively referred to as pumpjacks 204). The pumpjacks 204 may be fluidically coupled to a chemical tank 206, a production tank 208, a separator unit 210, and/or a compressor 212. Various systems assembled in the upstream amenity 104 may be tasked with the production of crude oil, or natural gas, which may be later refined in the refinery 106c and further transported using communication pathways 110 to the gas storage facility 108a in the downstream amenity 108. Any airborne pollutants, or gases, and composition thereof in the atmosphere, produced in the oil and gas supply-chain 102 may be sensed by the air quality monitor 202. The air quality monitor 202 may be installed throughout the oil and gas supply-chain 102, i.e., the upstream amenity 104, the midstream amenity 106, and the downstream amenity 108.

Figure 3:
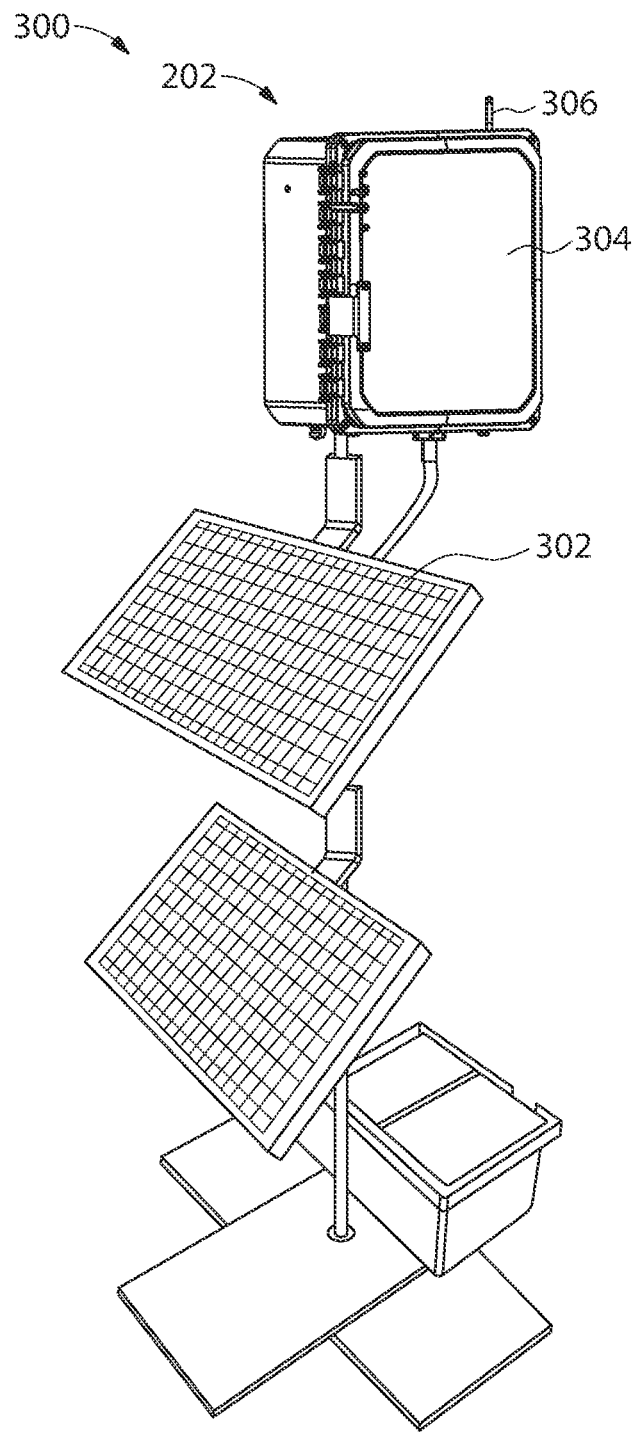
FIG. 3 illustrates a perspective view of an air quality monitor installed in the upstream amenity of FIG. 2.

Now referring to FIG. 3 illustrating a perspective view 300 of the air quality monitor 202. The air quality monitor 202 may be capable of measuring a target compound and at least one environmental parameter (e.g., a weather condition) in a collocated and contemporaneous manner. The measurement function of the air quality monitor 202 may be performed by the compound sensor or gaseous sensors embedded therein. These sensor(s) are point sensors, which means that their function is to measure a particular physical-chemical property of the target compounds to distinguish them from background atmospheric composition. Targeted compounds may include but are not limited to gases and aerosols emitted by industrial, anthropogenic, or natural activities. In particular, one configuration focuses on hydrocarbons and other greenhouse gases that absorb energy from radiation in the mid-IR region of the electromagnetic (EM) spectrum with a wavelength between 1 um and 5 um.

In one configuration, with continued reference to FIG. 3, the air quality monitor 202 may be operated using a solar power system 302. The solar power system 302 may be designed to provide sufficient power to the various other subsystems and to provide sufficient reserves and capacity to ensure the proper functioning of the air quality monitor 202 in most environmental conditions present in the field. The solar power system 302 may be replaced by wind-based or gas-based power generation or any other form of compact power generation system if the conditions warrant it. For instance, at high latitudes, wind-based power generation may be preferable to solar on account of low insolation.

With continued reference to FIG. 3, the compound sensors or the gaseous sensors may be placed, or housed in an enclosure 304. The enclosure 304 may be configured to protect the system from environmental hazards, or any tampering from unknown sources. Hazards may include but are not limited to precipitation, moisture, surface water and flooding, high temperature and insolation, low temperature, high wind, storms, hurricanes, typhoons, tornadoes, lightning, external impact and vibration, robbery, defacement, damage, earthquakes, light or electromagnetic interference, foreign agents or fauna and flora disturbance or intrusion. The enclosure 304 may also be highly visible by day and reflective at night to avoid accidental damage. The enclosure 304 may be directly on the ground, mounted on a foundation, or pole mounted.

In another configuration, with continued reference to FIG. 3, sensor data corresponding to the compound gases sensed by the air quality monitor 202 may be transmitted to a remote location, using a communication module (not shown in the figure). The communication protocol may be wired as in a Supervisory Control and Data Acquisition system (referred to herein as a SCADA system) or wireless using Bluetooth®, Wi-Fi, LoRa, cellular, satellite, other radiofrequency, optical line of sight, or other wireless data-transmission protocol. If a wireless protocol is employed, the data may be relayed using a communication antenna 306, if appropriate. In general, a communication system, which may include a communication antenna 306, has a role that may include the communication of the measurement to a remote or centralized node and the receipt of communication related to settings and operations changes or firmware updates. The communication system may be used to relay messages to and from other air quality monitor 202 such as in a daisy chain, star, or mesh configuration to reduce the communication cost when relying on external communication infrastructure such as cellular or satellite communication networks.

Figure 4:
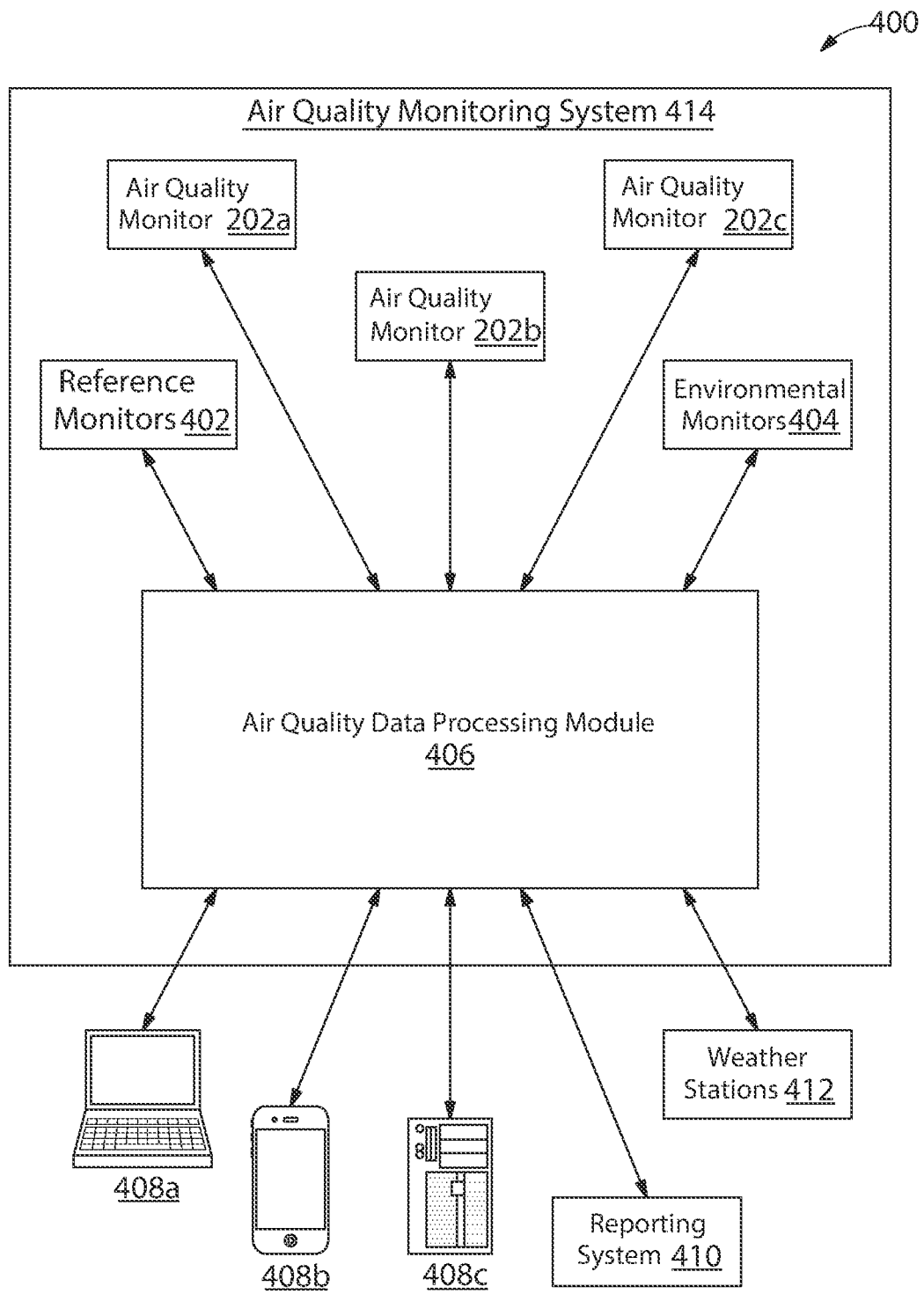
FIG. 4 illustrates a system layout of the air quality monitoring system of the air quality monitor of FIG. 3.

Referring to FIG. 4 illustrating a system layout 400 of the air quality monitoring system 414 provided with representative components that may be included therein. The air quality monitoring system 414 may include an air quality data processing module 406, air quality monitors 202 (illustrated as air quality monitors 202a, 202b, and 202c in the figure), reference monitors 402, and environmental monitors 404. The air quality monitors 202 may include at least one chemical sensor configured to detect and measure chemicals such as ozone, nitrogen oxide, carbon dioxide, sulfur dioxide, volatile organic compounds, methane or other hydrocarbons and other chemicals in gaseous state (herein described as "gaseous chemicals"). The air quality monitors 202 may also include at least one particle sensor configured to detect and measure the presence of suspended particles in the air such as dust, smoke, pollen, or soot (herein collectively described as "particulate matter" or "PM"). With reference to FIG. 2, the air quality monitor 202 may be located at multiple different locations within the upstream amenity 104, such that measurements related to the gaseous chemicals may be measured within the upstream amenity 104.

In one configuration, the reference monitors 402 may include precision gaseous chemical sensors configured to provide measurements for use in calibrating the gaseous sensors in the air quality monitor 202. Further, the environmental monitors 404 may be configured to measure environmental conditions such as humidity, atmospheric temperature, atmospheric pressure, air density, ambient light, geographic location, wind speed and direction, and the like. In another configuration, the air quality data processing module 406 may be configured to communicate with the air quality monitor 202, and reference monitors 402. For example, air quality data processing module 406 may receive data from these monitors such as measurements related to the concentration of various particulates in the atmosphere. The air quality data processing module 406 may also transmit data to these monitors as calibration data, to generate or calculate cross-calibration factors. The air quality data processing module 406 may correct measurements from the air quality monitor 202 using the generated cross-calibration factors. Air quality data processing module 406 may be also configured to process the data from monitors and perform analysis to calculate or infer additional air quality data such as the amount of various gaseous chemicals in various locations, sources of those gaseous chemicals, and recommendations based on elicited requirements or preferences of end users. Air quality data processing module 406 may be configured to communicate with, computing devices 408a, and mobile devices 408b, to receive data and provide received, calculated, and inferred air quality data. For example, air quality data processing module 406 may receive user-input data and use that data to derive additional air quality data relevant to the area of analysis. Air quality data processing module 406 may also be configured to communicate with other sources of data such as reporting system 410 and weather station 412. Air quality data processing module 406 may be implemented in any appropriate physical or virtual computing platform such as a networked server and may operate and act through any suitable interface such as a cloud computing platform.

In another configuration, the air quality monitoring system 414 may also be configured to process incoming data to provide a variety of outputs. For example, air quality monitoring system 414 may analyze measurements from the air quality monitor 202 to determine the sources of the gaseous chemicals being detected. Air quality monitoring system 414 may provide actionable steps to affect the chemical sources such as ways to reduce the release of those chemicals or ways to minimize exposure to those chemicals. It may do so by making use of stated preferences or user requirements and/or ancillary (e.g., topological, geological, meteorological, or demographic) datasets relevant to the area of investigation.

Figure 5:
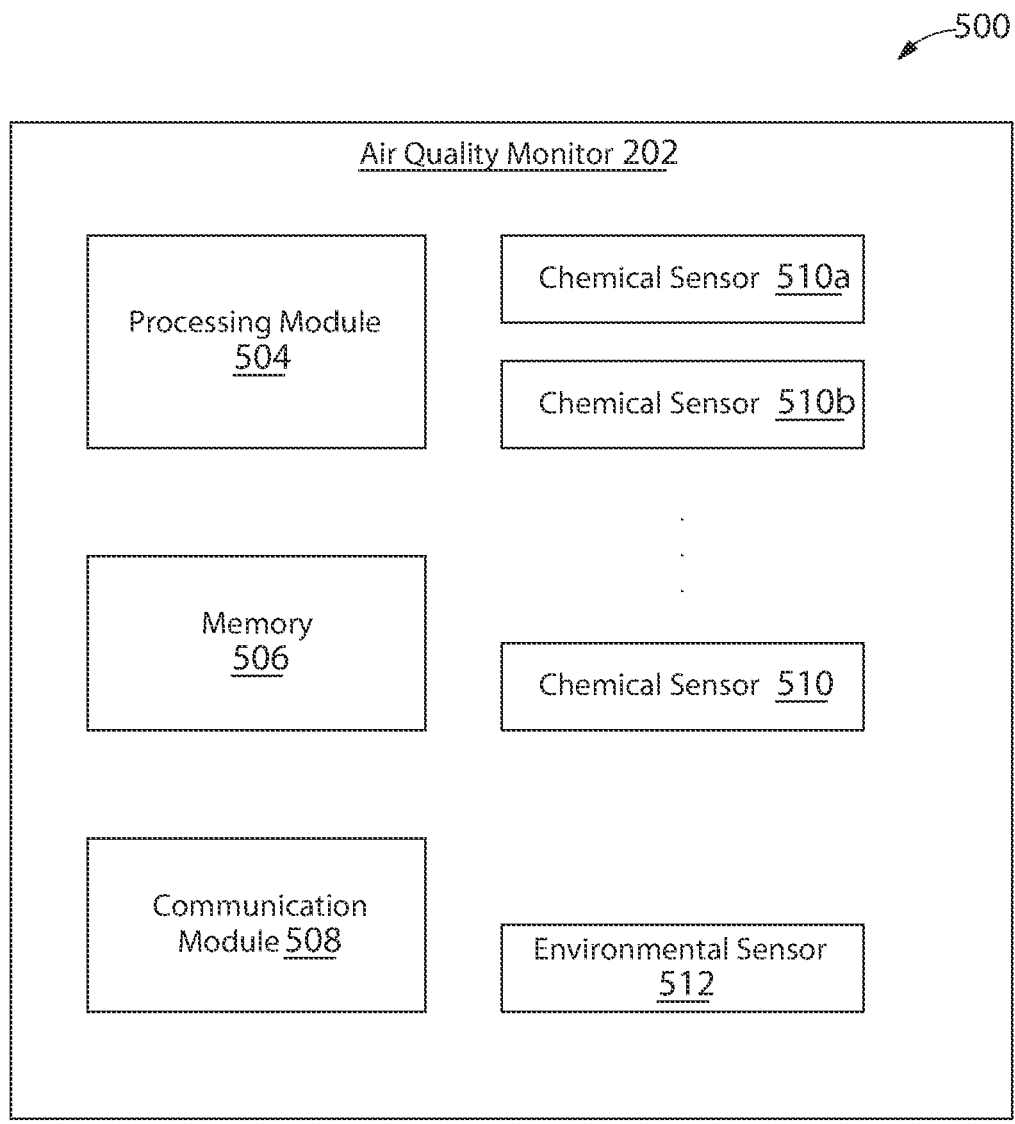
FIG. 5 illustrates another system layout of the air quality monitor of FIG. 3.

Referring to FIG. 5 illustrating another layout 500 of an example air quality monitor 202 provided with representative components that may be included therein. The air quality monitor 202 may include a processing module 504, memory 506, communication module 508, and at least one gaseous chemical sensor such as chemical sensor 510*a* or 510*b* (hereinafter collectively referred to as "chemical sensors 510"), and environmental sensor 512. Processing module 504 may be configured to perform computing tasks and controls other components. For example, one of the computing tasks may include calibration. Memory 506 may be configured to store data such as measurement data from chemical sensors 510 and calibration data such as cross-calibration factors. Chemical sensors 510 are configured to measure gaseous substance or chemicals and airborne particulates, or airborne pollutants in analyte gas (sometime simply referred to herein as target substances). Environmental sensor 512 measures environmental conditions such as temperature, pressure, humidity, location, wind speed, and the like. Communication module 508 handles communication with other devices. For example, communication module 508 may handle communication between air quality monitor 202 and air quality data processing module 406 of FIG. 4, other air quality monitors, user devices such as mobile devices 408*b* and computing devices 408*a*, 408*c*, and the like. The communication module 508 may communicate through any of a variety of wired and wireless mechanisms such as Wi-Fi, Bluetooth, mobile networks, long-range radio, satellite, and the like. Air quality monitor 202 may also be configured to measure time, position, and other relevant information for computing devices. The components, functionality, and configuration of the sensor can be selected based on desired monitoring capabilities. At least one air quality monitor 202 may also measure a set of individual atmospheric readings. The set of individual atmospheric readings may include at least one of the following: barometric pressure, air temperature, or humidity level.

In another configuration, the individual atmospheric readings at the upstream amenity 104 may be one of the set of environmental parameters from a set of environmental parameters (hereinafter referred to as set of upstream environmental parameters). The set of upstream environmental parameters may further include air quality index, biodiversity, hydrology parameters such as sediment transport and deposition, the intensity of solar radiation, and photosynthetically active radiation.

Figure 6:
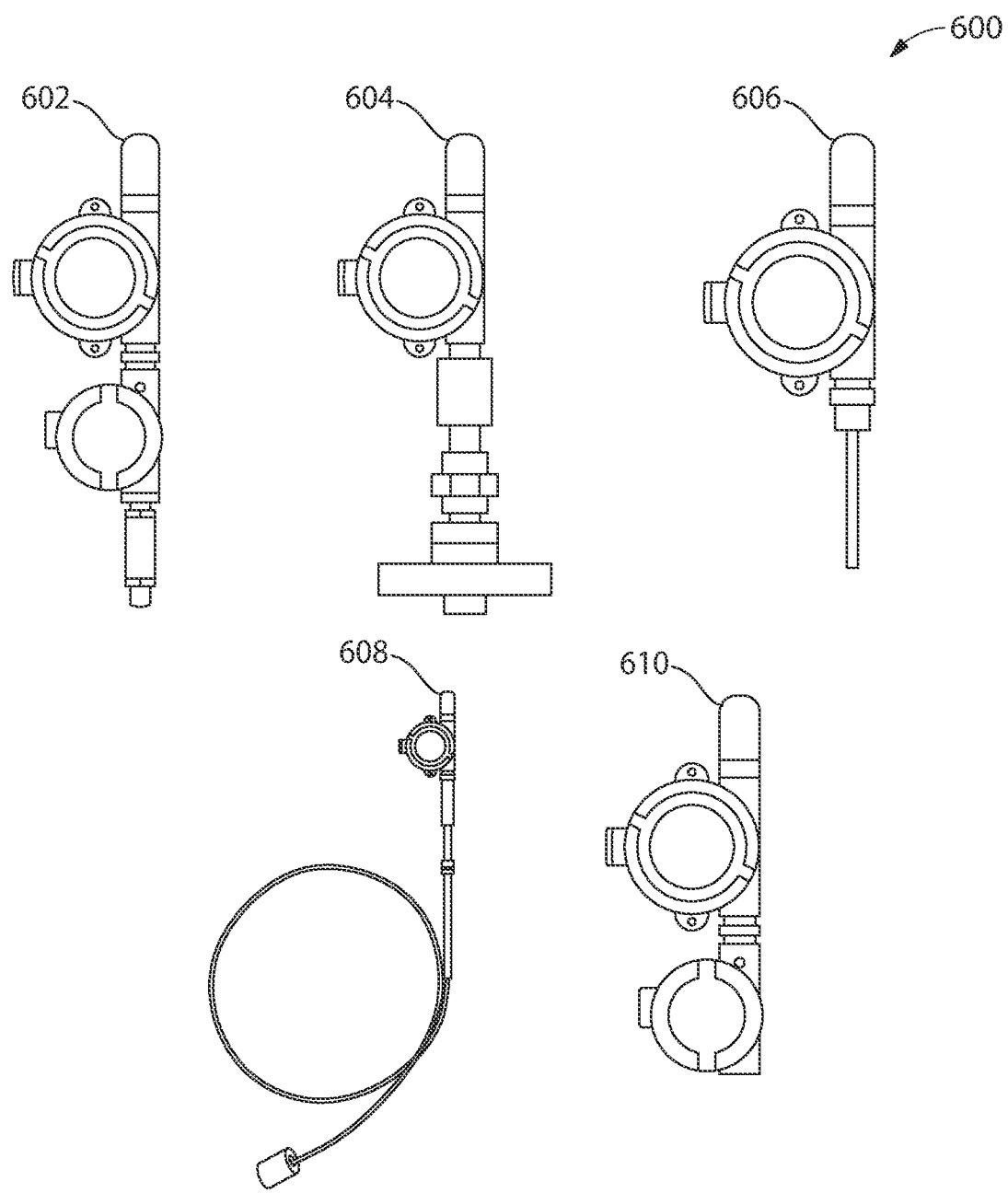
FIG. 6 illustrates a schematic view of at least one device installed in the upstream amenity of FIG. 2.

Referring to FIG. 6 illustrating a schematic view 600 of at least one device deployed at the upstream amenity 104 may be illustrated. The at least one device may include pressure sensors 602, flow sensors 604, temperature sensors 606, level sensors 608, and other discrete sensors 610. The at least one device may be installed at the upstream amenity 104, as illustrated by FIG. 2. Again, referring to FIG. 6 and by way of an example, the pressure sensor 602 may include pressure switches, piezoelectric sensors, manometers, and the like. The pressure sensors may be deployed at a compressor or a wellhead pressure head and may be configured to generate a signal in response to the pressure of a fluid maintained in the aforementioned units. Similarly, flow sensors 604, temperature sensors 606, level sensors 608, and other discrete sensors 610 may be configured to generate electric signals representative of the flow rate, temperature, level, and other parameters of the oil and/or gas, respectively. These parameters may be represented as set of physical parameters of the upstream amenity 104 (hereinafter referred to as set of upstream physical parameters).

Figure 7:
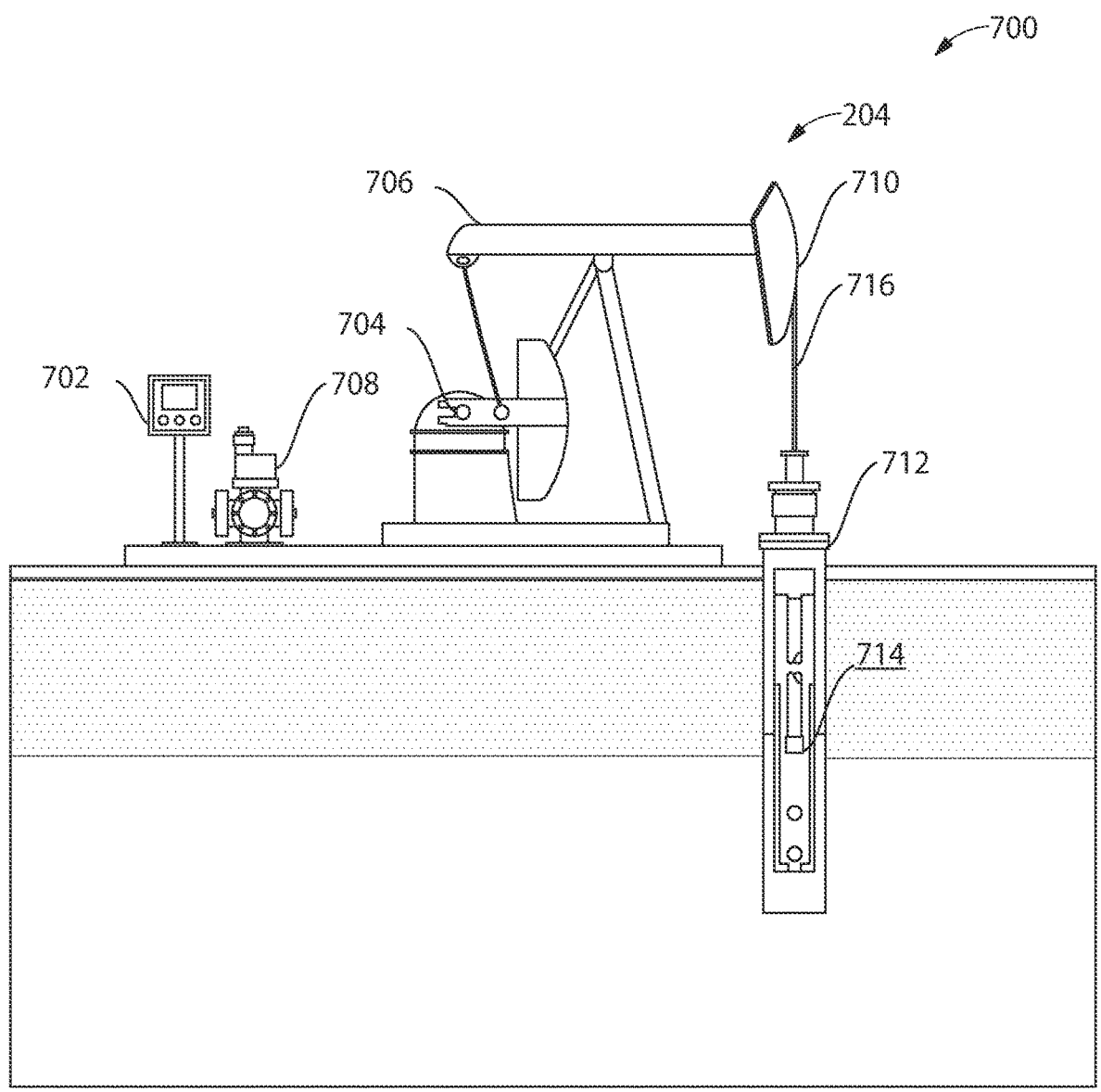
FIG. 7 illustrates a side view of the operation of a pumpjack installed in the upstream amenity of FIG. 2.

Referring to FIG. 7 illustrating a side view 700 of the operation of a pumpjack 204. The pumpjack 204 may include a motor 708, a gearbox 704, a walking beam 706, a horse head 710, a bridle 716, a pump 712, and a piston 714 positioned in the pump 712. The pumpjack 204 may be connected to a control unit 702. Further, the control unit 702 may include a user interface and a display. A site operator may access the user interface to manually adjust the operation of the pumpjack 204. The operation of the pumpjack 204 may include output from the motor 708, which may drive the gearbox 704. Driving the gearbox 704 may further actuate the walking beam 706. As illustrated by FIG. 7, the horse head 710 may be connected to the walking beam 706. Further, the bridle 716 may be extended from the horse head 710, and bridle 716 may be connected to the pump 712. Actuation of the walking beam 706 may further oscillate the horse head 710 in a vertical direction, thereby operating the pump 712 such that the piston 714 in the pump 712 may oscillate in tandem with the horse head. The actuation of the piston 714 may lift or excavate the emulsion from the oil well. The control unit 702 may be configured to control the operation of the pumpjack 204 via, for example, the output of the motor 708, the gear ratio and output speed from the gearbox 704, or the actuation speed of the walking beam 706, which may further impact the oscillation speed of the horse head 710, the bridle 716 and the pump 712. Operational parameters such as speed (in RPM or meters/second) and frequency (cycles per second) may be acquired as set of upstream operational parameters. Further, a peak load on the walking beam 706, a depth at which the pump 712 may be drilled into the oil well, and the diameter of the piston 714 may be included in the set of upstream operational parameters (either singular or a plurality thereof simply referred to herein as a set of upstream operational parameters).

Figure 8:
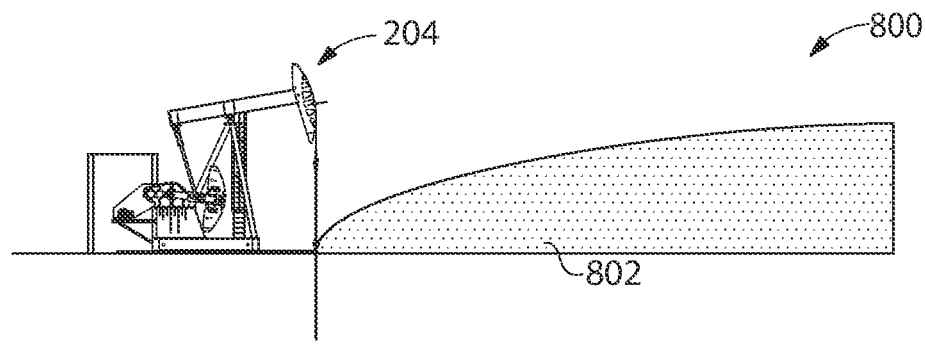
FIG. 8 illustrates a side view of an emission plume emitted from the pumpjack of FIG. 7.
Figure 9:
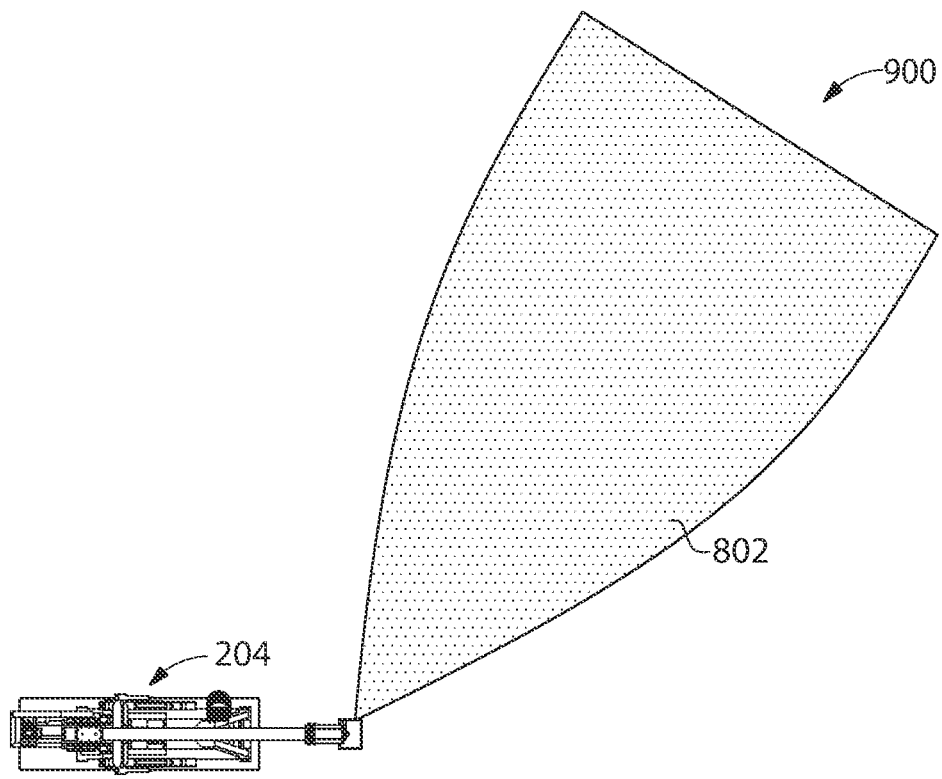
FIG. 9 illustrates a top view of an emission plume emitted from the pumpjack of FIG. 7.
Figure 10:
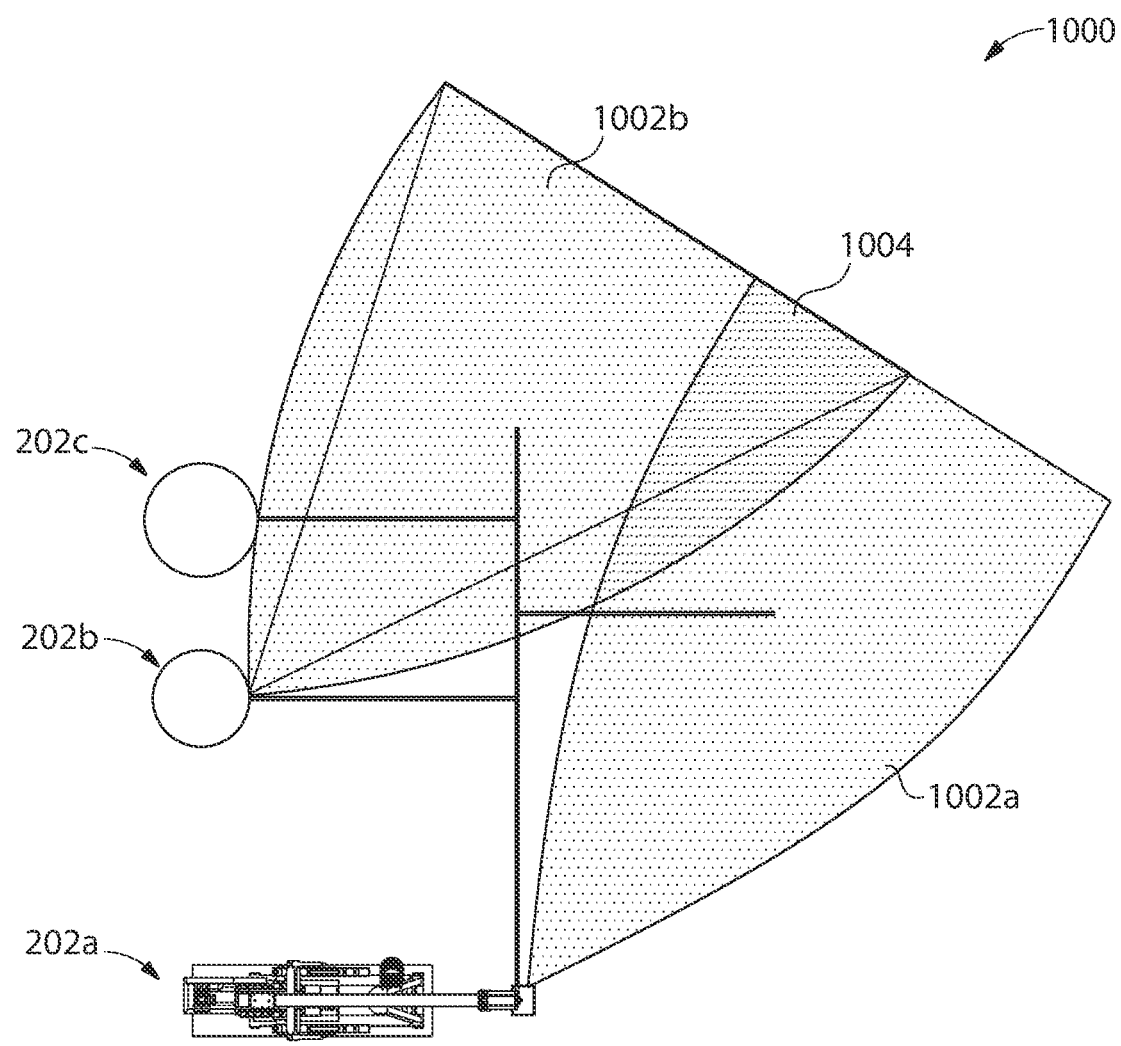
FIG. 10 illustrates a top view of multiple emission plumes emitted from one or more pumpjacks in the upstream amenity.

Now referring to FIG. 8, illustrating a side view 800 of an emission plume emitted from the pumpjack 204, FIG. 9 illustrating a top view 900 of an emission plume emitted from the pumpjack 204, and FIG. 10 illustrating a top view 1000 of an emission plume emitted from one or more pumpjack 204.

With continued reference to FIGS. 8-9, during drilling of the crude oil from an oil well, the pumpjack 204 may be operated in a manner explained in conjunction with FIG. 7. Further, during operation, the pumpjack 204 may be configured to emit a gaseous plume 802. The gaseous plume 802 may include gaseous chemicals, which may be sensed by the air quality monitor 202. The air quality monitor 202 may be configured to generate a concentration signal representative of concentrations of particulate matter present in the gaseous plume 802. The concentration signal may also be included in the set of upstream environmental parameters.

With continued reference to FIG. 10, the upstream amenity 104 may include multiple potential emission sources from at least one pumpjack 204*a*, and 204*b*. Further, the upstream amenity 104 may include the air quality monitor 202. In the scenario depicted in FIG. 10, a target compound may be emitted from the pumpjack 204*a* and may form an emission plume 1002*a*. Similarly, another, or the same target compound may be emitted from the pumpjack 204b and may form another emission plume 1002b. The emission plume 1002a may be obstructed by the emission plume 1002b, thereby forming a mixed emission plume 1004. Therefore, for such a scenario, a confounding signal may be generated from each of the air quality monitors 202, which may be representative of the concentration of one or more gaseous chemicals. The confounding signal may be later processed, and individual concentration profiles of each of the gaseous chemicals may also be obtained and included in the set of upstream environmental parameters.

Figure 11:
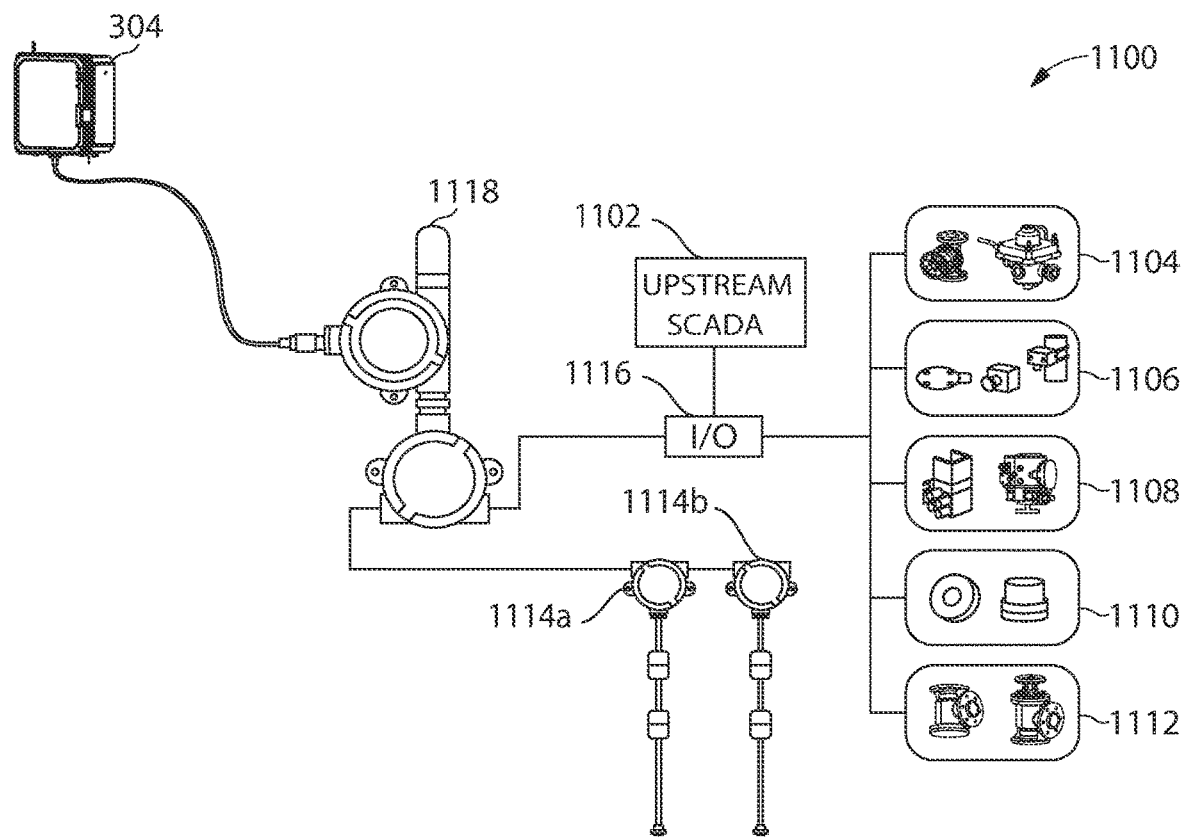
FIG. 11 illustrates an architecture of a SCADA system connected with the upstream amenity.

Referring now to FIG. 11 illustrating an architecture 1100 of a supervisory-control-and-data-acquisition system (hereinafter referred to as SCADA system) connected to the upstream amenity 104. In one configuration, the SCADA system may include an upstream SCADA system 1102 connected to the enclosure 304 and the at least one device deployed on the upstream amenity 104. The upstream amenity 104 may include an input/output module 1116. In an exemplary configuration, at least one device may include at least one sensor 1104, at least one control valve 1106, at least one solenoid 1108, at least one alarm 1110, and at least one discrete sensor 1112. The at least one sensor 1104 may be configured to sense and determine one or more operational parameters of the one or more devices and may further transmit the operational parameters to an input/output module 1116. Further, the upstream SCADA system 1102 may be connected to the output module 1116. The input/output module 1116 may be further connected to the air quality monitor 202 via a master communication module 1118. The master communication module 1118 may be further connected to the slave communication modules 1114a, and 1114b. Further, the slave communication modules 1114a, and 1114b may be connected to a master communication units of other air quality monitors (not shown in the figure) positioned on upstream amenity 104. Similarly, the upstream SCADA system 1102 may be configured to acquire concentration signals from the other air quality monitors 202 via the slave communication modules 1114a and 1114b.

The air quality monitor 202 may be configured to create historical data related to emissions given the topology of the upstream amenity 104 and may be configured to transmit the historical data to the input/output module 1116. The upstream SCADA system 1102 may be configured to acquire both the historical data of the air quality monitor 202, from the input/output module 1116 as a set of upstream environmental parameters. Further, each output from at least one device including at least one sensor 1104, at least one control valve 1106, at least one solenoid 1108, at least one alarm 1110, and the at least one discrete sensor 1112 may be transmitted to the input/output module 1116. Further the upstream SCADA system 1102 may be configured to obtain the output from at least one device as an operational parameter. The operational parameter obtained by the upstream SCADA system 1102 may correspond to the upstream amenity 104, and hence, may be included in the set of upstream operational parameters.

The upstream SCADA system 1102 may be configured to obtain a set of upstream physical parameters at the upstream amenity 104. The set of upstream physical parameters may include a geological location of the installation site of the upstream amenity. Geological surveys may be conducted using various means from testing subsoil for onshore exploration to using seismic imaging for offshore exploration. Based on the survey, the geological location may be finalized for the installation of the upstream amenity 104. Also, based on the energy reserves, energy companies compete for access to mineral rights granted by governments by either entering a concession agreement, as any discovered oil and gas are the property of the producers or a production-sharing agreement. Therefore, information corresponding to a landowner of the site may be obtained by the upstream SCADA system 1102. Especially when the landowner may belong to the marginalized faction, various government initiatives have been undertaken to boost welfare for the marginalized faction, so that domestic production may also be boosted thereby reducing dependency on oil offshore locations. In some implementations, the landowner of the amenity site may be associated with, part of, characterized, etc. by other means such as (but not limited to) marginalized faction, race profile, location, procurement impact, processing impact, transportation means, transportation duration, term of land ownership, original land title lineage, proceeds usage/pledges, or any variable of similar identifying attributes (characteristic-vectors).

Figure 12:
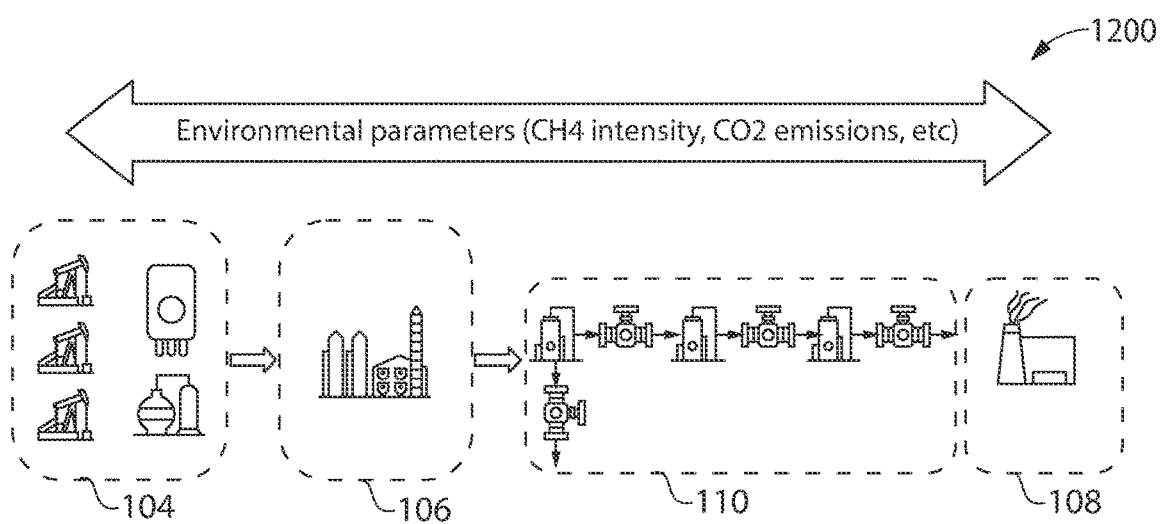
FIG. 12 illustrates a process layout of the oil and gas supply-chain.

Referring to FIG. 12 illustrating a process layout 1200 of the oil and gas supply-chain 102. The upstream amenity 104 may be connected to at least one pre-processing unit (referred to as pre-processing unit 1304 in FIG. 13), which may be a part of the midstream amenity 106. The pre-processing unit may include processing plants such as refinery 106c. The upstream amenity 104 may be configured to transmit the crude oil to the pre-processing unit in the midstream amenity 106, via the communication pathways 110. The volumetric flow rate, and the pressure at which the crude oil may be transmitted to the downstream amenity 108, may be obtained as upstream physical parameters. After obtaining the crude oil from the upstream amenity 104, the pre-processing unit may be configured to gather and refine to initiate transportation of the crude oil to the downstream amenity 108 through the communication pathways 110. The process of transfer of the crude oil to downstream amenity 108 may be illustrated in detail, in conjunction with FIGS. 13-18.

Figure 13:
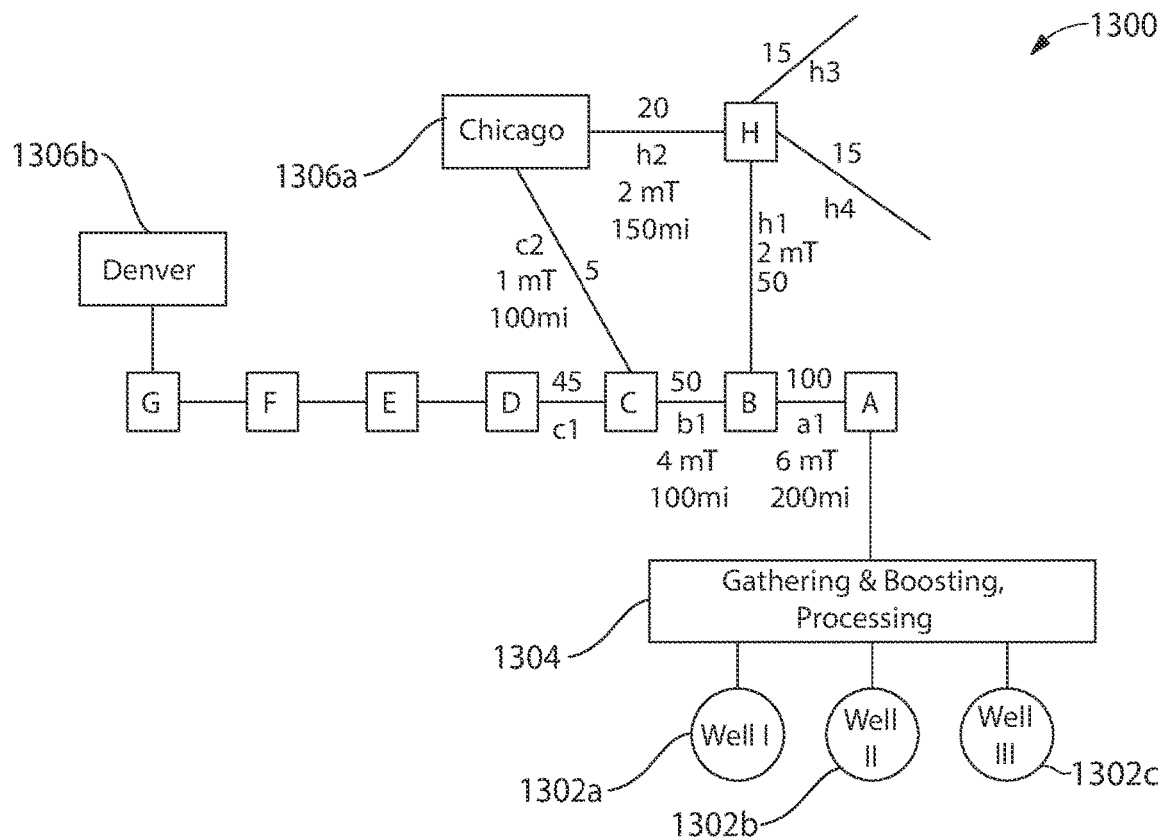
FIG. 13 illustrates a transmission layout of an oil and gas supply-chain from the upstream amenity to the downstream amenity.

Referring now to FIG. 13, illustrating a transmission layout 1300 of the oil and gas supply-chain 102 from the upstream amenity 104 to the downstream amenity 108. As explained earlier, and by way of an example, the upstream amenity 104 and the downstream amenity 108 may be connected by the communication pathways 110. Referring back to FIG. 13, crude oil may be extracted from a plurality of oil wells 1302a, 1302b, and 1302c (hereinafter referred to as oil wells 1302) in the upstream amenity 104. The crude oil may be excavated from the using one or more pumpjack 204, the process of which is already illustrated by FIG. 7. Now, the crude oil may be collected by the pre-processing unit 1304 of midstream amenity 106, and which, as illustrated earlier, may be configured to process and refine the crude oil into natural gas, or refined gas (hereinafter referred to as processed oil), to the downstream amenity 108. Further, the processed oil may be transported through communication paths a1, b1, c1, c2 h2, and h4, which may be designated as the communication pathways 110, to the downstream amenity 108. However, it must be noted that based on the topological, economical, and environmental factors, the communication path a1, b1, c1, c2 h2, and h4 may be designed. As illustrated in the figure, each communication path may be formed between compressor stations A-B-C-D-E-F-G-H. Such as communication path a1 may be designed between compressor stations A and B, and communication path b1 may be designed between compressor stations B-C. It must be noted that the communication pathways 110 may not be limited to the communication paths a1, b1, c1, c2 h2, and h4, but may include more communication paths based on the location at which the downstream amenity 108 may be installed.

In an exemplary configuration, communication paths a1, b1, c1, c2 h2, h4 may include any one of the road transport network 110a, rail transport network 110b, or the pipeline network 110c (refer to FIG. 1). Again, referring to FIG. 13, the compressor stations A-B-C-D-E-F-G-H may include a turbine, a motor, or a stationary engine. Processed oil may be transmitted through the communication paths a1, b1, c1, c2 h2, and h4, under high pressure to ensure mobility throughout the pipeline network 110c. Therefore, the compressor stations A-B-C-D-E-F-G-H may be fluidically connected to, or stationed along, the communication paths a1, b1, c1, c2 h2, h4, such that transmission of the processed oil may be maintained under uniform pressure. Sometimes herein, the communication paths may be referred to as one or more of an energy supply pipeline.

In an exemplary configuration, with continuous reference to FIG. 13, 6 metric tons (mT) of the processed oil from the pre-processing unit 1304 may be received at the compressor station A, which may be transferred to the compressor station B which may be situated at 200 miles from compressor station A. Further, as demanded by downstream amenities, from the compression station B, a portion of the processed oil (2 mT) may be diverted through communication path h1 to the compressor station H, and the remaining portion of the processed oil may be transmitted to the compression station C through the communication path b1. The demand of the downstream amenities may be best illustrated in the scenario, in which a demand for crude oil may be requested by a delivery station 1306a. For example, when the delivery station 1306a, based in Chicago, submits a demand of 1 metric ton of processed oil gas, the nearby compression station C may be configured to transmit the requisite demand from the processed oil received from the compressor station B to the delivery station 1306a through the communication path c2, and the remaining processed oil may be transmitted to a delivery station 1306b, which may be stationed at Denver.

In one configuration, from initiation to delivery, and through transmission, the processed oil may be categorized and measured in terms of energy units, for example, MMBtu, which is a British thermal unit for defining the energy content of the processed gas. The crude oil extracted at the upstream amenity 104 may be measured in terms of upstream energy amount. For example, if 2 million gallons of crude oil may be extracted at the upstream amenity 104, the upstream energy amount for the 2 million gallons of crude oil may range between 2,80,000 MMBtus to 3,00,000 MMBtus. This upstream energy amount may be acquired as the operational parameters by the upstream SCADA system 1102.

However, the inclusion of such entities in the oil and gas supply-chain 102 may result in missing out on process parameters. For example, parameters corresponding to the gathering, boosting, and initiating transportation may be inevitably missed, or may not be recorded manually or automatically due to the processing of a large pool of data and information from the oil and gas supply-chain 102.

In addition to missing data, some circumstances may also occur due to faults, or any anomalies occurring in the pipeline network 110c. Circumstances such as line pack, commonly known as the phenomenon of storage of gas in the pipeline network 110c, or malfunctioning of the compressor stations may cause temporal delays in the delivery of the processed oil to the downstream amenity 108. Also, during transmission, due to leaks or damage in the communication pathways 110 may reduce pressure, or affect the flow rate of the processed oil through the communication pathways 110. Such scenarios may reduce the integrity and data transparency of the oil and gas supply-chain 102, thereby forming a genesis for efficient tracking of the processed oil throughout the oil and gas supply-chain 102.

Figure 14:
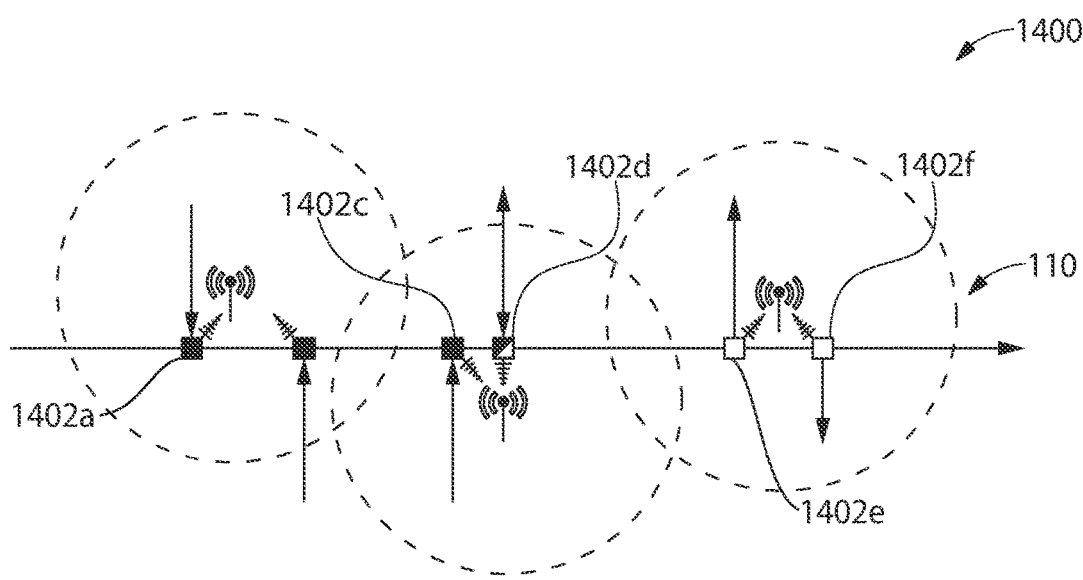
FIG. 14 illustrates a communication architecture installed at communication pathways.

Therefore, to track the processed oil through each of the devices stationed in the oil and gas supply-chain 102, a communication architecture may be installed throughout the upstream amenity 104, the midstream amenity 106, and the downstream amenity 108. Now, referring to FIG. 14 illustrating a communication architecture 1400 installed at the communication pathways 110. A communication module may be installed at each of the entities 1402a-1402f stationed along the communication pathways 110. The entities 1402a-1402f may include compressor stations, various sensors configured to sense flow rate or energy units associated with the processed oil transmitted through the communication pathways 110. Iteratively, over a predefined time period, the entities 1402a-1402f may be configured to provide the midstream amenity physical parameters, such as the flow rate of the processed oil, or the pressure at which the processed oil may be transmitted. This set of process parameters may be communicated wirelessly, or through a hard-wired connection, to another SCADA system, which may be illustrated later in conjunction with FIG. 15.

Figure 15:
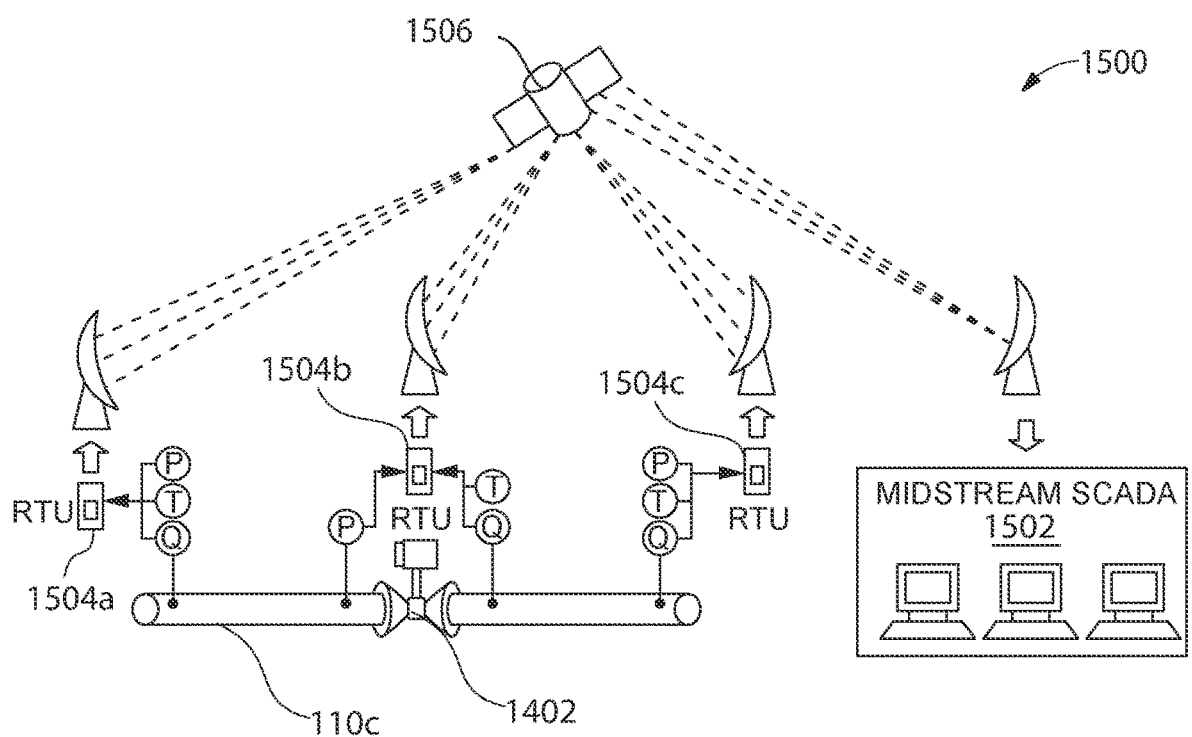
FIG. 15 illustrates a communication architecture of a SCADA system connected with the communication pathways of FIG. 14.

Now referring to FIG. 15 illustrating a communication architecture 1500 of a SCADA system connected with the communication pathways. In this configuration, the communication pathways 110 may be connected to another SCADA system, preferably a midstream SCADA system 1502. Particularly, each of the entities 1402 may be connected to the midstream SCADA system 1502. In another configuration, each of the entities 1402 may be connected to at least one data collection units 1504a, 1504b, and 1504c (hereinafter referred to as data collection units 1504), such as a Remote Terminal Units (RTUs) or a Programmable Logic Controllers (PLCs). The data collection units 1504 associated with entities 1402 may be configured to collect process parameters such as pressure, temperature, flow rate, and the like. As illustrated in FIG. 15, the data collection units 1504 may also be connected to the pipeline network 110c. In an exemplary configuration, the data collection units 1504 may be configured to accumulate and compile the process parameters as a set of midstream operational parameters, such as rate of flow of the processed oil, pressure at which the processed oil may be transmitted through pipeline network 110c, the temperature of the processed oil in the pipeline network 110c, and the like. The data collection units 1504 may also be configured to accumulate and compile a set of midstream operational parameters such as rate of flow of the processed oil, and the pressure at which the processed oil may be received at entities 1402. The data collection units 1504 may be further connected to the midstream SCADA system 1502 via a satellite communication 1506, through which the set of midstream operational parameters related to the pipeline network 110c and the entities 1402 may be transmitted from the data collection units 1504 to the midstream SCADA system 1502. Using the communication architecture illustrated in FIG. 15, even a set of physical parameters from the pipeline network 110c may be easily obtained and processed, especially in scenarios such as locations in which immediate human intervention may be required, but accessibility to those locations may be limited. In another configuration, processed oil transmitted through the midstream amenity 106 communication pathways 110 may be measured in terms of midstream energy amount. For example, if 0.5 million gallons of processed oil may be transmitted through the midstream amenity 106 and the communication pathways 110, the midstream energy amount for the 0.5 million gallons of processed oil may range between 168000 MMBtus to 180000 MMBtus. This midstream energy amount may be acquired as the operational parameter by the midstream SCADA system 1502.

As discussed earlier, scenarios involving line pack delays or leaks may result in affecting the set of midstream physical parameters. For example, the pipeline involved in the leak may reduce the volumetric flow rate, and pressure at which the processed oil may be transmitted through the pipeline network 110c. Also, factors such as the presence of uncontained water, or liquid petroleum in the gas supply may alter, or vary the compressibility of the processed oil during transmission. Also, leaks in the pipeline may affect the surrounding land, thereby disturbing the surrounding environment at which the pipeline network 110c may be installed. Therefore, a scarred land may be formed. These factors, such as rate of leaks, area or a predefined scarred land, variation of pressure, and volumetric flow rate, may be included in the set of midstream physical parameters, which may also be obtained by midstream SCADA system 1502.

In another configuration, the midstream amenity 106 may also include air quality monitor 202 (refer to FIG. 2). The air quality monitor 202 may be configured to sense a midstream environmental parameter such as individual atmospheric readings of the midstream amenity 106, or emissions occurring at the midstream amenity 106. Further, the midstream SCADA system 1502 may be configured to collect other environmental parameters such as air quality index, biodiversity, hydrology parameters such as sediment transport and deposition, and the like, to form a set of midstream environmental parameters.

Figure 16:
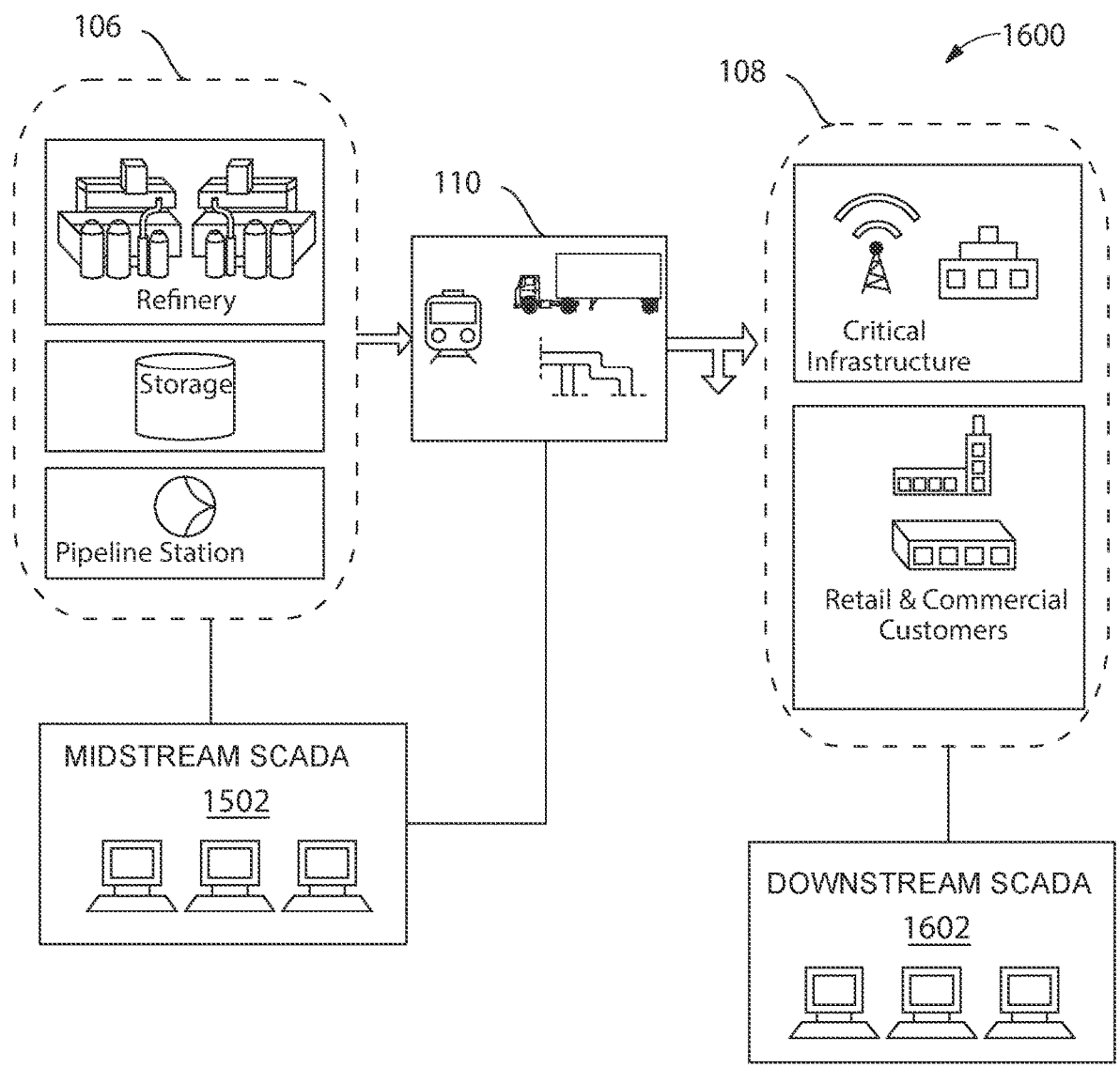
FIG. 16 illustrates a communication architecture of multiple SCADA systems with the midstream amenity and the downstream amenity.

Referring to FIG. 16 illustrating a layout 1600 of a communication architecture between multiple SCADAs, the midstream amenity 106, and the downstream amenity 108. The midstream SCADA system 1502 may be connected to the midstream amenity 106, and as explained earlier, may be further connected to the communication pathways 110. Similarly, the downstream amenity 108 may be connected to a downstream SCADA system 1602. The downstream SCADA system 1602 may operate in a similar mechanism as the upstream SCADA system 1102 and the midstream SCADA system 1502, i.e., the downstream SCADA system 1602 may be configured to obtain operational parameters related to at least one device in the downstream amenity 108, which may include but not limited to a volumetric capacity of the gas storage units, industrial units, commercial complexes, or households; in addition to flow rate of the processed oil, the pressure of the processed oil received at the downstream amenity 108, and the like. The processed oil transmitted at the downstream amenity 108 may be measured in terms of downstream energy amount. For example, if 12 gallons of processed oil may be delivered at the downstream amenity 108, the downstream energy amount for the 12 gallons of processed oil may range between 67000 MMBtus to 80000 MMBtus. This downstream energy amount may be acquired as the operational parameter by the downstream SCADA system 1602.

The downstream SCADA system 1602 may be configured to sense, and obtain the set of downstream environmental parameters, as well as the set of downstream physical parameters. The set of downstream environmental parameters may correspond to the concentration of gas, in the atmosphere, and individual atmospheric readings at the downstream amenity 108, such as barometric pressure, temperature, humidity, temperature, atmospheric pressure, air density, ambient light, geographic location, wind speed, and direction. Further, the downstream SCADA system 1602 may also be configured to obtain the set of downstream physical parameters similar to the upstream SCADA system 1102 of the upstream amenity 104, i.e., a volumetric flow rate and pressure at which the processed oil may be received at the downstream amenity 108, as well as the information of landowner at which the downstream amenity 108 may be installed.

Figure 17:
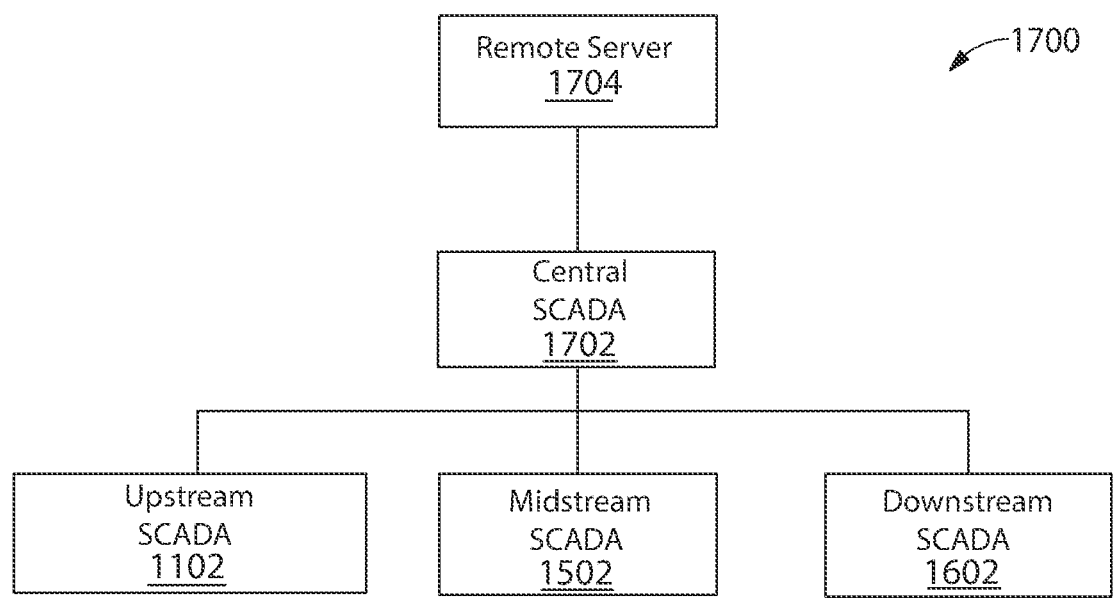
FIG. 17 illustrates a layout of a networked SCADA system.

Referring now to FIG. 17 illustrating a layout 1700 of a networked SCADA system. The upstream SCADA system 1102, the midstream SCADA system 1502, and the downstream SCADA system 1602 may be configured as a networked SCADA system. Networked SCADA systems may be configured to allow access to the set of environmental parameters, the set of physical parameters, and the set of operational parameters from each of the upstream amenity 104, midstream amenity 106, downstream amenity 108, and communication pathways 110. Further, the transmission of data related to environmental, physical, and operational parameters from all the amenities may be achieved through widespread network architecture, which may include, but is not limited to, a local area network (LAN), a wide area network (WAN), or a combination of networks. The widespread network architecture may be implemented with hardware (e.g., silicon chipsets, antenna), software (e.g., protocol stacks, applications), or a combination thereof. In some scenarios, the oil and gas supply-chain 102, the midstream amenity 106, the downstream amenity 108, and the communication pathways 110 may include more than one communication units to support different interfaces, protocols, and or communication standards with different devices and or network nodes.

Again referring to FIG. 17, using the widespread network architecture, the upstream SCADA system 1102, the midstream SCADA system 1502, and the downstream SCADA system 1602 may be connected to a central SCADA system 1702. The central SCADA system 1702 may be configured to obtain environmental, physical, and operational parameters associated with upstream amenity 104, the midstream amenity 106, and the downstream amenity 108. Further, the environmental, physical, and operational parameters associated with the amenities may comply, with or be aggregated by the central SCADA system 1702, and further transmitted to a remote server 1704, using the widespread network architecture. The remote server 1704 may be installed onsite of the upstream amenity 104, the midstream amenity 106, and the downstream amenity 108.

Figure 18:
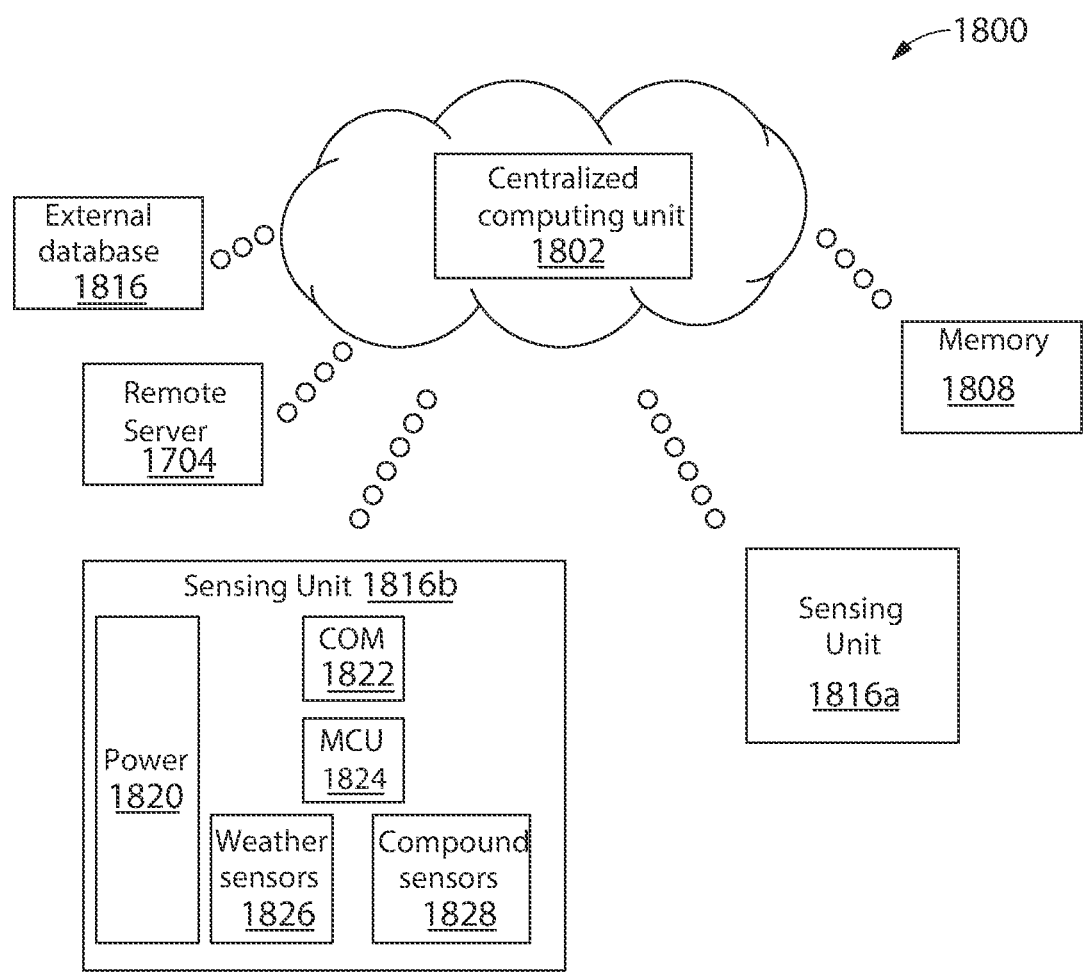
FIG. 18 illustrates a layout of an overall communication architecture of the oil and gas supply-chain.

Referring now to FIG. 18 illustrating a layout 1800 of an overall communication architecture of the oil and gas supply-chain 102. Sensing units 1816a and 1816b, which may or may not be the same as air quality monitor 202 described in FIG. 2, may incorporate components such as a power system 1820, weather sensors 1826, compound sensors 1828, a computing unit 1824 and a communication unit 1822. Sensing unit 1816a may relay sensor data to centralized computing unit 1802 using a network layer. The network layer may rely on existing communication infrastructure such as cellular or satellite, or it might use dedicated infrastructure such as custom wired or wireless systems including but not limited to Wi-Fi, Bluetooth, LoRa, and other telemetry and data-transmission systems. The data transmission may rely on other network infrastructures such as the internet or dedicated networks such as intranet or LAN.

Once data reaches centralized computing unit 1802, processing may be performed to transform raw data into actionable data. To transform the raw compound measurements into speciation and concentrations, an external database 1816 such as the HiTRAN database may be queried for reference spectra of the target gas.

The centralized computing unit 1802 may be connected to the remote server 1704. The centralized computing unit 1802 may be configured to obtain the set of environmental parameters, the set of operational parameters, and the set of physical parameters associated with the upstream amenity 104, the midstream amenity 106, the downstream amenity 108, and the communication pathways 110 from the remote server 1704. Once received, the centralized computing unit 1802 may be configured to execute a set of instructions, to generate a set of environmental characteristic-vectors, the set of operational characteristic-vectors, and the set of physical characteristic-vectors. Characteristic-vectors herein may be defined as data related to attributes, or inherent characteristics estimated by evaluating historical parameters, i.e., previously recorded parameters related to environment, machinery, or anomalies, averaged over a predefined time period which may be stored in remote server 1704.

The centralized computing unit 1802 may be configured to obtain the set of environmental parameters, the set of operational parameters, and the set of physical parameters associated with the upstream amenity 104, the midstream amenity 106, the downstream amenity 108, and the communication pathways 110 from the remote server 1704 iteratively, over a predefined time period. The set of environmental parameters, the set of operational parameters, and the set of physical parameters may be transmitted in batches corresponding to days, months, and years. For example, environmental characteristic-vectors may be calculated by analyzing historical data on the set of environmental parameters, such as emissions occurring over a predefined time period in the upstream amenity 104, the midstream amenity 106, and the downstream amenity 108. The environmental characteristic-vectors may represent trends of the set of environmental parameters, or frequency and the magnitude of the frequency of emissions occurring in the upstream amenity 104, the midstream amenity 106, and the downstream amenity 108. The environmental characteristic-vectors may include gross atmospheric readings, and emissions occurring at the upstream amenity 104, the midstream amenity 106, and the downstream amenity 108. Similarly, the historical data corresponding to the set of physical parameters, such as volumetric flow rate and the corresponding pressure of the crude oil and the processed oil may be analyzed to generate the set of physical characteristic-vectors. Similarly, the centralized computing unit 1802 may be configured to calculate the set of operational characteristic-vectors of the upstream amenity 104, the midstream amenity 106, and the downstream amenity 108, such as upstream operational characteristic-vectors, midstream operational characteristic-vectors, and the downstream operational characteristic-vectors by analyzing historical data of the set of operational parameters obtained from the remote server 1704.

In another configuration, the centralized computing unit 1802 may be configured to calculate a gross average of each of the set of environmental characteristic-vectors, set of operational characteristic-vectors, and physical characteristic-vectors. For example, by obtaining environmental characteristic-vectors for a predefined time period occurring in years, in the upstream amenity 104, the midstream amenity 106, the downstream amenity 108, and the communication pathways 110, the centralized computing unit 1802 may be configured to calculate gross environmental characteristic-vectors occurring over the predefined time period. Similarly, the gross physical characteristic-vectors and the gross operational characteristic-vectors may be calculated by the centralized computing unit 1802. The calculated characteristic-vectors may be stored in a memory 1808.

Figure 19:
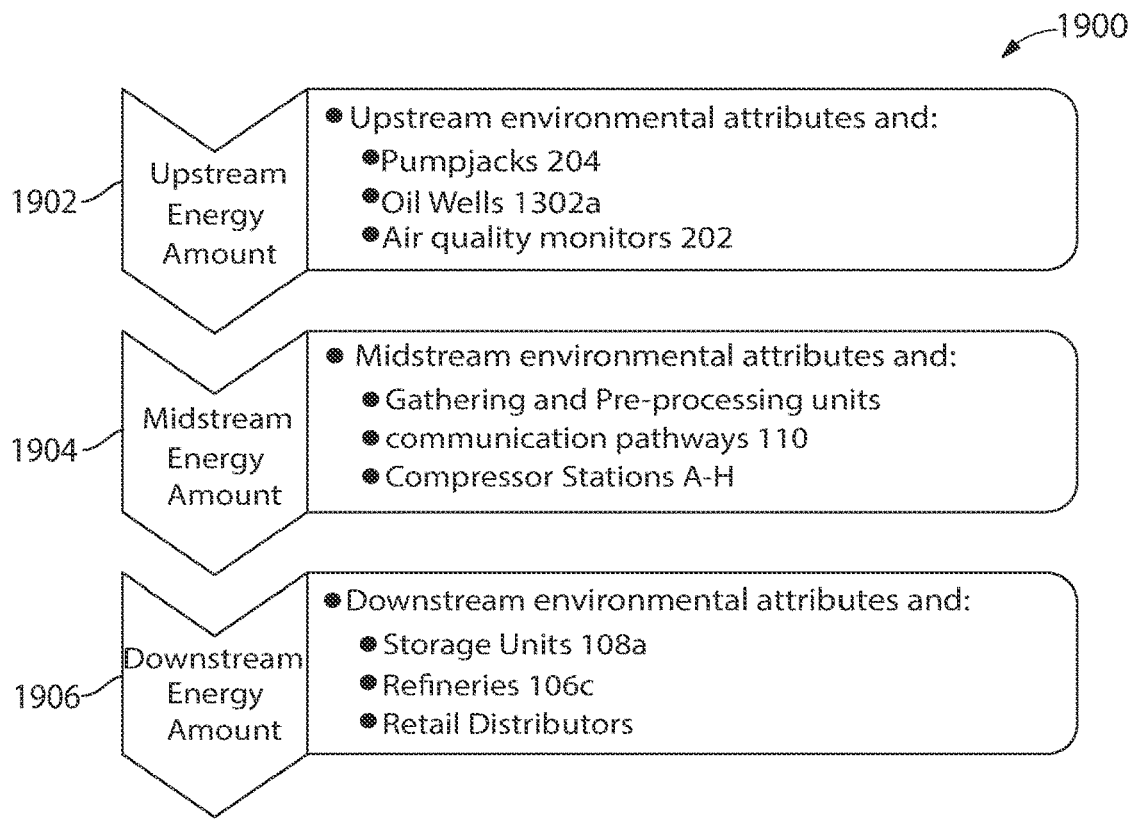
FIG. 19 illustrates another process layout of the oil and gas supply-chain.

Referring now to FIG. 19 illustrating another process layout 1900 of the oil and gas supply-chain 102. Represented by block 1902, the centralized computing unit 1802 may be configured to associate the upstream energy amount with the environmental characteristic-vectors of the upstream amenity 104. For example, the upstream energy amount corresponding to the crude oil extracted may be correlated with the set of environmental characteristic-vectors and the set of physical characteristic-vectors, to estimate the energy content of the crude oil extracted under influence of the environmental characteristic-vectors. For example, 2 million barrels having an upstream energy amount ranging between 2,80,000 MMBtus to 3,00,000 MMBtus may be extracted by the pumpjack 204, plurality of oil wells 1302a, 1302b, at an atmospheric pressure ranging between 29.6-30.2 inches Hg, temperature ranging between 122° F. and 200° F., and an emission ranging between 4 to 50 grams/megajoule measured using air quality monitor 202. Any variation in the environmental characteristic-vectors may influence the extraction of crude oil.

At block 1904, the midstream energy amount may be associated with the set of midstream environmental characteristic-vectors and the set of midstream physical characteristic-vectors. For example, the midstream energy amount from the processed oil may be associated with the set of midstream environmental and the set of midstream physical characteristic-vectors, such as the set of midstream physical characteristic-vectors related to refining i.e., density and sulfur content may be associated with the energy amount of the processed oil. Further, physical characteristic-vectors of the communication pathways 110, such as the volumetric flow rate associated with the midstream energy amount may be associated with the content of uncontained water or uncontained liquid petroleum, and any leak caused in the communication pathways 110 may be correlated with the midstream energy amount. Environmental characteristic-vectors such as emissions occurring during transmitting through communication pathways 110 may be associated with the midstream energy amount, for example, the midstream energy amount for the 0.5 million gallons of processed oil ranging between 168000 MMBtus to 180000 MMBtus may be associated with a volumetric flow rate of 2000 ft$^3$/second, through a pipe having a diameter ranging between 20-28 inches, with emissions ranging between 0.04-0.06 kg $CO_2$ per cubic foot.

Similarly, at block 1906, the downstream energy amount may be associated with the downstream environmental characteristic-vectors and the set of downstream physical characteristic-vectors. For example, the set of downstream environmental characteristic-vectors such as the emissions occurring at the downstream amenity 108 may be associated with the downstream energy amount, i.e., the downstream energy amount for the 0.2-0.5 million gallons of processed oil ranging between 67000 MMBtus to 80000 MMBtus may be associated with a volumetric flow rate of 800 ft$^3$/second, through a pipe having a diameter ranging between 12-18 inches, with emissions ranging between 0.04-0.06 kg $CO_2$ per cubic foot.

In another configuration, a successful merchandising, or a transacting, between the upstream amenity 104 and the midstream amenity 106 may be enabled, if the upstream energy amount associated with the upstream environmental characteristic-vectors may be calculated and co-related in the downstream energy amount associated with the downstream environmental characteristic-vectors. For example, the plurality of oil wells 1302a, 1302b, and 1302c may be configured to extract and transmit 2 million gallons of crude oil having an upstream energy amount ranging between 2,80,000 MMBtus to 3,00,000 MMBtus through the pipeline having an inner diameter ranging between 4 to 48 inches, at a pressure ranging between 200-3000 psi, and at a temperature ranging between 90° F. and 130° F. Further, the midstream amenity 106 may be configured to receive and process the crude oil to produce the processed oil having a downstream energy amount ranging between 40000 MMBtus to 55000 MMBtus, and further transfer the processed oil at a pressure ranging between 500-1400 psi, through the pipeline network 110c having an internal diameter ranging between 26-30 inches, and a temperature ranging between 100° F. to 120° F., to the downstream amenity 108. At downstream amenity 108, the processed oil may be received by various units, receiving units such as gas storage facility 108a receiving 20000 MMBtus, and households 108b receiving 30000 MMBtus. The transferring of the processed oil may be verified, for confirming that the gross volume energy amount may be equal (including losses, if any) throughout the oil and gas supply-chain 102. If an equivalency may be established, thereby, the transaction may be completed. However, the existence of any error, or any functional anomaly between the upstream energy amount and the downstream energy amount, may indicate the loss of crude oil, or processed oil within the oil and gas supply-chain 102, the location of which may be indicated by processing the set of environmental characteristic-vectors, the set of physical characteristic-vectors, and the set of operational characteristic-vectors which may be associated with the upstream energy amount and the downstream energy amount.

Figure 20:
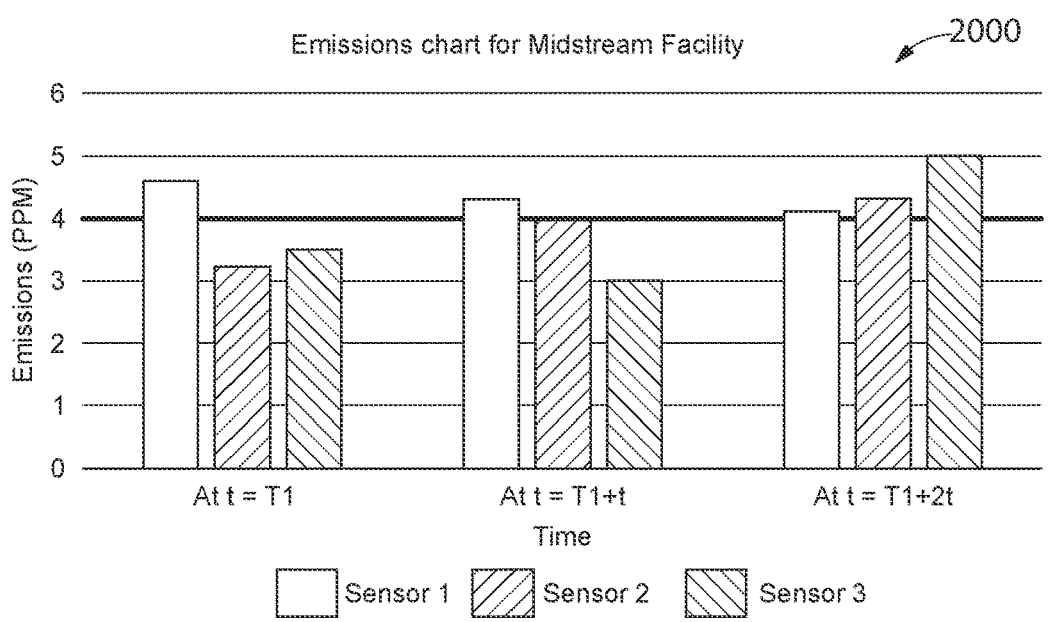
FIG. 20 illustrates an emissions chart of the midstream amenity.

Referring to FIG. 20 illustrating an exemplary configuration, an emissions chart of the midstream amenity 106. An anomaly that may lead to unsuccessful transactions may be determined based on tracking the characteristic-vectors associated with the upstream amenity 104, the midstream amenity 106, and the downstream amenity 108, respectively. For example, emissions related to midstream amenity 106 may be monitored at time T, T+t (after a predefined time t), and T+2t (after a predefined time 2t). At any time, multiple sensors (Sensor 1, sensor 2, and sensor 3) may generate an emissions signal to indicate emissions against a predefined threshold occurring at the midstream amenity 106. Referring to the figure, at time T, only sensor 1 may report an emission beyond the predefined threshold of 4 PPM. As time progresses, at time T+t, sensor 1 and sensor 2 may report an emission beyond the predefined threshold of 4 PPM, and at time T+2t, all the sensors may report emissions beyond the predefined threshold of 4 PPM. Therefore, the scenario at time T+2t may be accounted for the anomaly, i.e., a leak occurring at the midstream amenity 106, which may eventually disrupt the transaction between the upstream amenity 104 and the downstream amenity 108.

Therefore, associating the energy amount at each stage in the upstream amenity 104, the midstream amenity 106, and the downstream amenity 108 with the physical and environmental characteristic-vectors may provide tracking of crude oil and processed oil throughout the oil and gas supply-chain 102. Therefore, any anomaly or any other loss may be reported, and mitigated with prompt response accordingly, to ensure integrity in the oil and gas supply-chain 102.

Figure 21A:
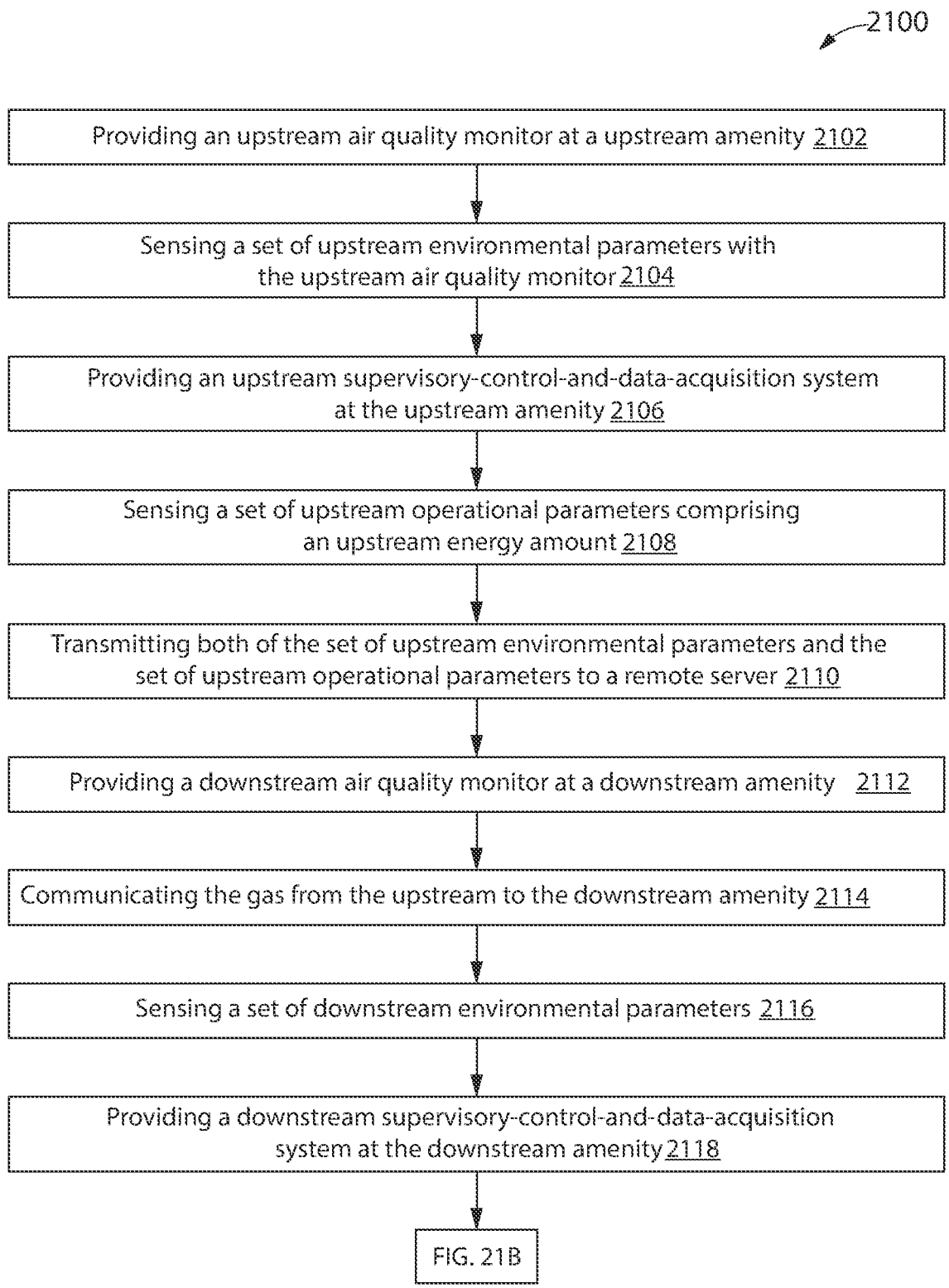
FIG. 21A-21B illustrates a flow chart of a supply-chain characteristic-vectors merchant method for an environmental characteristic-vectors of the gas communicating from an upstream amenity to a downstream amenity.
Figure 21B:
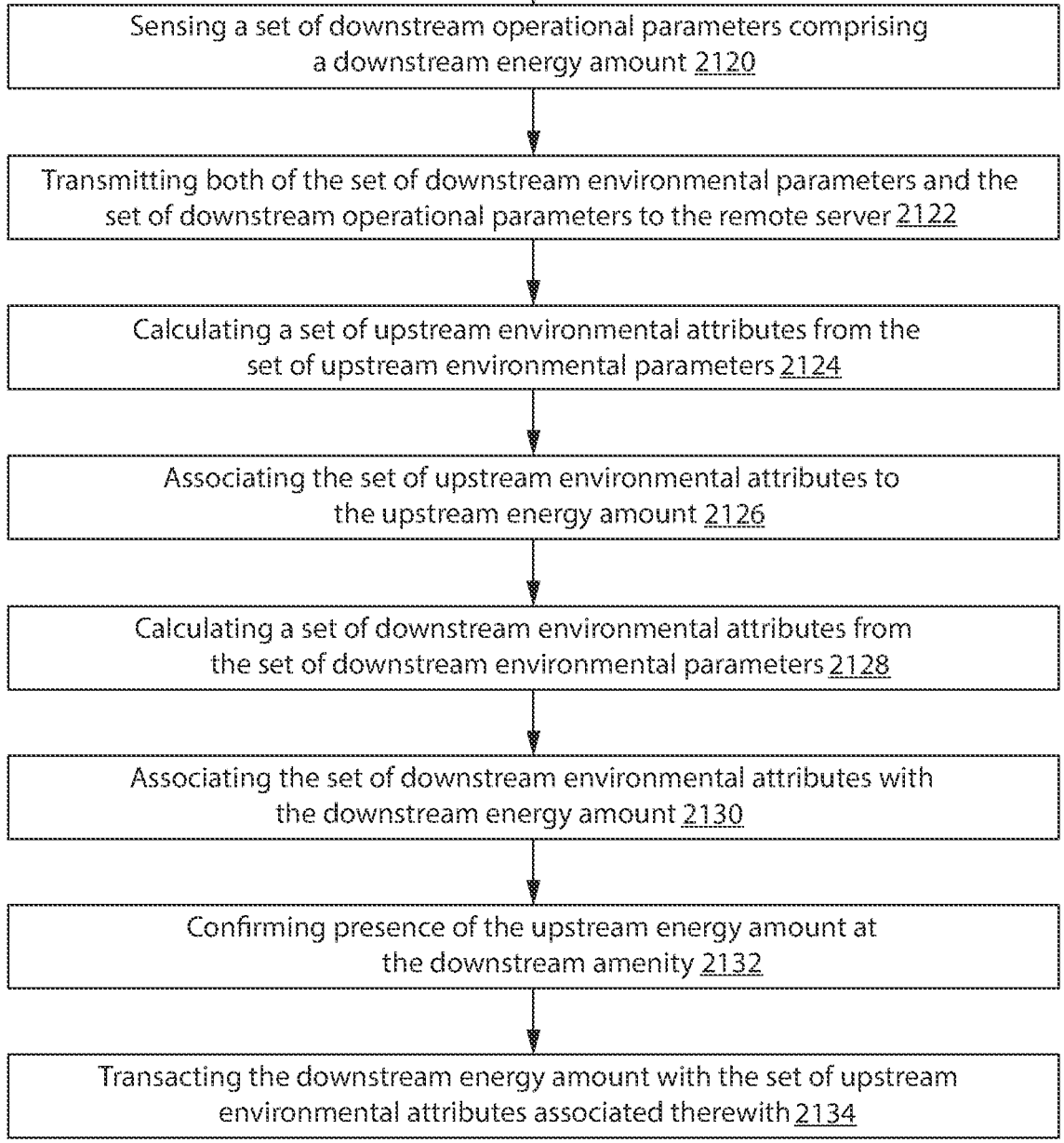

Referring now to FIGS. 21A-21B illustrating a flow chart 2100 of a supply-chain characteristic-vectors merchant method for an environmental characteristic-vectors of a gas communicating from an upstream amenity 104 to a downstream amenity 108. The supply-chain characteristic-vectors merchant method may be performed by processing the set of environmental parameters, the set of operational parameters, and the set of physical parameters associated with the upstream amenity 104, the midstream amenity 106, the downstream amenity 108, and the communication pathways 110.

At step 2102, an air quality monitor 202 may be provided at the upstream amenity 104 (sometimes referred to herein as an upstream air quality monitor). As illustrated in FIGS. 2-4, the air quality monitor 202 may include one or more sensors responsive to the gaseous chemical. At step 2104, a set of upstream environmental parameters may be sensed by the air quality monitor 202 positioned at the upstream amenity 104. The upstream environmental parameters may include the concentration of the target gaseous chemical. Additionally, the set of upstream environmental parameters may also include atmospheric characteristics such as barometric pressure, an air temperature, a humidity level, a wind-direction, or a wind-speed at the upstream amenity 104.

At step 2106, an upstream SCADA system 1102 may be provided at the upstream amenity 104. The upstream SCADA system 1102 may be connected to at least one device in the upstream amenity 104, which may include but is not limited to pressure sensors, pressure vessels, separators, drills, and the like. The upstream SCADA system 1102 may be configured to monitor and supervise at the least one device at the upstream amenity 104.

At step 2108, the set of upstream operational parameters from the at least one device may be sensed by the upstream SCADA system 1102. The set of operational parameters may include operational parameter, such as pressure obtained from the pressure sensors, or an upstream energy amount, such as energy amount in thermal units associated with the crude oil extracted at the upstream amenity 104.

At step 2110, the set of upstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104 and the downstream amenity 108, may be configured to transmit the associated parameters to a central SCADA system 1702. The central SCADA system 1702 may further transmit the associated parameters to the remote server 1704.

At step 2112, an air quality monitor 202 may be provided at the downstream amenity 108. At step 2114, a set of downstream environmental parameters may be sensed by the air quality monitor 202 positioned at the downstream amenity 108 (the air quality monitor 202 may sometimes referred to herein as set of downstream air quality monitor). The set of downstream environmental parameters may include the concentration of the target gaseous chemical, from the emissions occurring at the downstream amenity 108. Additionally, the set of downstream environmental parameters may also include atmospheric characteristics such as barometric pressure, an air temperature, a humidity level, wind direction, or wind speed at the downstream amenity 108.

At step 2116, processed oil such as gas may be communicated from the upstream amenity 104 to the downstream amenity 108. The processed oil may be transmitted through communication pathways 110 (illustrated in FIG. 1), using at least one of road transport network 110*a*, rail transport network 110*b*, or pipeline network 110*c*.

At step 2118, a downstream SCADA system 1602 may be provided at the downstream amenity 108. The downstream SCADA system 1602 may be connected and may be configured to monitor and supervise at least one device in the downstream amenity 108, which may include but is not limited to a volumetric capacity of the gas storage units, industrial units, commercial complexes, or households.

At step 2120, downstream operational parameters from the at least one device may be sensed by the downstream SCADA system 1602. The downstream operational parameters may include operational parameters, such as the rate of gas delivery to devices at the downstream amenity 108, and a downstream energy amount, such as the energy amount in thermal units associated with the gas delivered at the downstream amenity 108.

At step 2122, the set of upstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104, may be configured to transmit the associated set of parameters to a central SCADA system 1702. The central SCADA system 1702 may further transmit the associated parameters to the remote server 1704.

At step 2124, a set of upstream environmental characteristic-vectors from the set of upstream environmental parameters may be calculated. The set of environmental characteristic-vectors may be calculated based on the historical data of the set of environmental parameters sensed in the upstream amenity 104. For example, the atmospheric pressure, air temperature, and a humidity level, may be associated over time, to generate the set of upstream characteristic-vectors of the environment for the upstream amenity 104. Further, at step 2126, the set of upstream environmental characteristic-vectors may be associated with the upstream energy amount. In this step, each of the calculated upstream environmental characteristic-vectors from the set of upstream environmental characteristic-vectors may be associated with the energy amount of the extracted crude oil at the upstream amenity 104. For example, the set of environmental characteristic-vectors such as emissions, air temperature, and a humidity level may be associated with the energy content of the extracted crude oil.

At step 2128, a set of downstream environmental characteristic-vectors from the set of downstream environmental parameters may be calculated. The set of downstream environmental characteristic-vectors may be calculated based on the historical data of the set of downstream environmental parameters sensed in the downstream amenity 108. For example, the atmospheric pressure, air temperature, and a humidity level, may be associated over time, to generate the set of downstream characteristic-vectors of the downstream amenity 108. Further, at step 2130, the set of downstream environmental characteristic-vectors may be associated with the downstream energy amount. In this step, each of the calculated downstream environmental characteristic-vectors from the set of downstream environmental characteristic-vectors may be associated with the energy amount of the processed oil received at the downstream amenity 108. For example, the set of environmental characteristic-vectors such as emissions, air temperature, and a humidity level may be associated with the energy content of the processed oil.

At step 2132, the presence of upstream energy amount may be confirmed in downstream amenity 108. At the downstream amenity 108, the processed oil may be received and verified such that the downstream energy amount associated with the set of environmental characteristic-vectors therein (i.e., the set of downstream environmental characteristic-vectors) may be equivalent to the upstream energy amount associated with the set of upstream environmental characteristic-vectors at the upstream amenity 104. At step 2134, after confirmation of the presence of the upstream energy mount and the upstream environmental characteristic-vectors associated therewith in the downstream amenity 108, an equivalency may be established, and thereby, merchant may be completed.

Now, rising interest in the growth of the digital market, especially within the oil and gas supply-chain poses the risk of data tampering. For example, any competitor may unleash a cyber-attack to erase or tamper process data or manipulate information related to processes within the supply-chain. Therefore, to mitigate such events occurring in the oil and gas supply-chain 102, various parameters and data related to characteristic-vectors may be secured using encryption, to maintain integrity and transparency of access to data in the oil and gas supply-chain 102.

In an alternative configuration, a securing method, or encryption methods, such as cryptographic encryption, or multi-node encryption, may be implemented by executing relevant algorithms on the parameters obtained by the remote server 1704. For example, encryption may be implemented before transmission of the characteristic-vectors to the remote server 1704, by executing a set of algorithms such as the Noekeon Algorithm, as explained in "Network Data Encryption Transmission Method Based on the Noekeon Algorithm" authored by Jiong Tian et al. The Noekeon Algorithm may be configured to carry out the design and research of network data encryption transmission methods. Combined with the multi-node communication technology, a multi-node network data transmission model and a topological structure model may be established.

Figure 22:
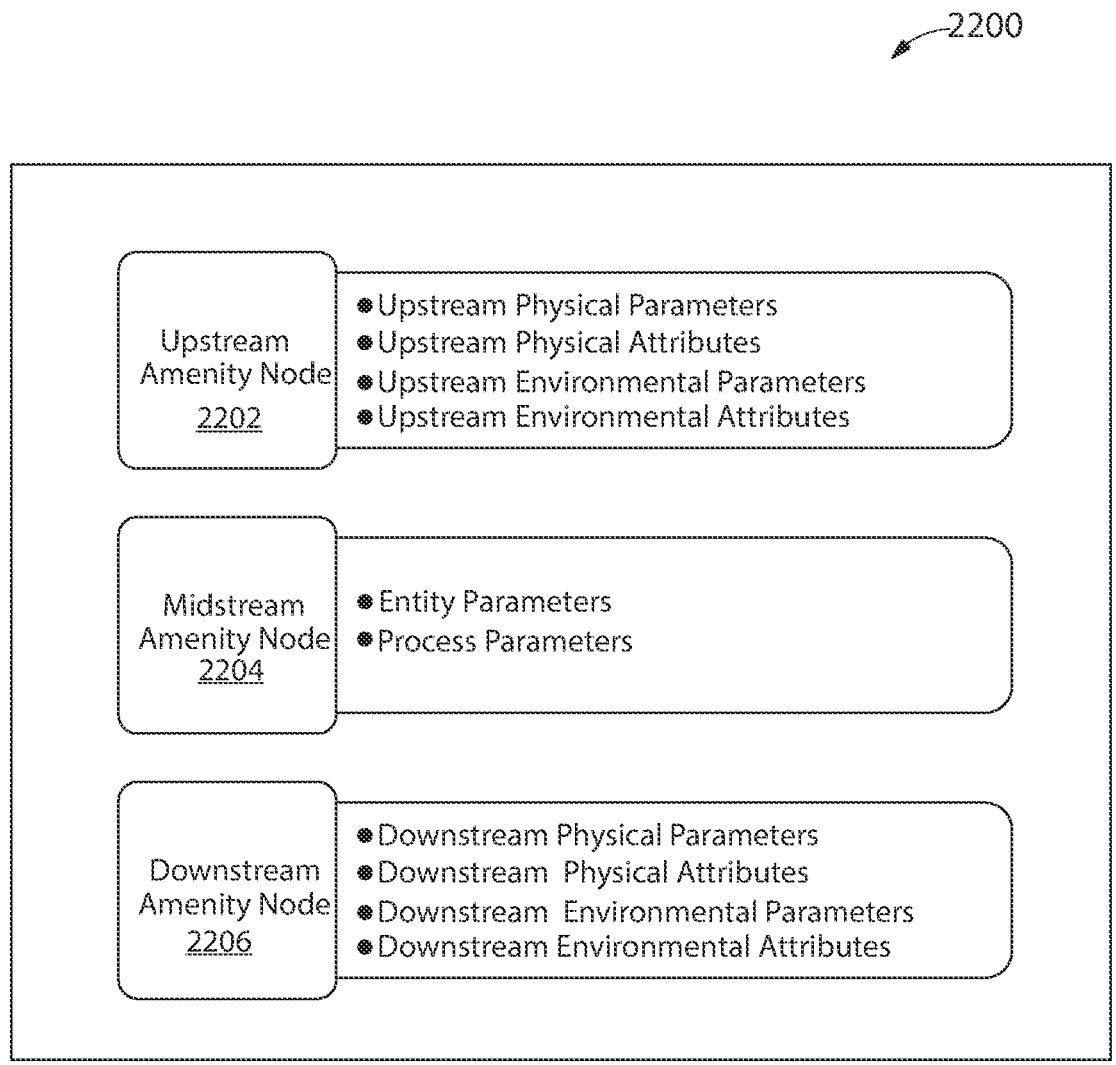
FIG. 22 illustrates a layout of a multi-node communication encryption model for the oil and gas supply-chain.

To this end, a supply-chain characteristic-vectors securing system and the supply-chain characteristic-vectors securing method is disclosed. Referring now to FIG. 22 illustrating a layout 2200 of a multi-node communication encryption model for the oil and gas supply-chain 102. The multi-node communication encryption model may include an upstream amenity node 2202, a midstream amenity node 2204, and a downstream amenity node 2206. As may be appreciated, the upstream amenity node 2202 may be configured to store and encrypt the set of parameters and the corresponding set of characteristic-vectors related to the upstream amenity 104, such as the set of upstream physical parameters, the set of upstream physical characteristic-vectors, the set of upstream environmental parameters, and the set of upstream environmental characteristic-vectors. Additionally, analysis for transfer of the processed oil from the upstream amenity 104 and the downstream amenity 108 may be encrypted. Similarly, the midstream amenity node 2204 may be configured to store and encrypt parameters associated with the midstream amenity 106, such as process parameters related to entities 1402 (refer to FIG. 14). Again, refer to FIG. 22, the downstream amenity node 2206 may be configured to store and encrypt parameters associated with the downstream amenity 108, such as downstream physical parameters, downstream physical characteristic-vectors, downstream environmental parameters, and downstream environmental characteristic-vectors.

After establishing the multi-node communication encryption model for the oil and gas supply-chain 102, for data transmission to the remote server 1704, the model may be processed through three steps, namely: encapsulation, transmission, and decapsulation. The process of encapsulation may include adding a TCP header, IP header, and MAC header to the architecture, and then converting a bit stream composed of the parameters and characteristic-vectors of the model into electrical signals for transmission in the network. Further, after receipt of the multi-node communication encryption model by the remote server 1704, the model may be distributed, or shared through a group of at least one user, private companies, or governmental organizations. Further, for decapsulation or decryption, a private node key associated with each of the upstream amenity node 2202, midstream amenity node 2204, and the downstream amenity node 2206 may be assigned, i.e., an upstream amenity node key may be assigned to the upstream amenity node 2202, a midstream amenity node key may be assigned to midstream amenity node 2204, and a downstream amenity node key may be assigned to the downstream amenity node 2206. Each of the private node keys may be allocated to a higher hierarchy associate within the group of at least one user, private companies, or governmental organizations, and a secure communication may be established therebetween in case any access or modification may be required within the data encrypted in the multi-node communication encryption model. For example, if the governmental organization may require access to the multi-node communication encryption model, all the users, or other users of the group may be notified using a notification module, or any notification-generation tool known in the art. After acceptance of all the users in the group, the private node key may be shared with the party requesting access, for decrypting or decapsulating the data encrypted in the multi-node communication encryption model. Therefore, any change or access to the data may be tracked by the users of the group.

Figure 23A:
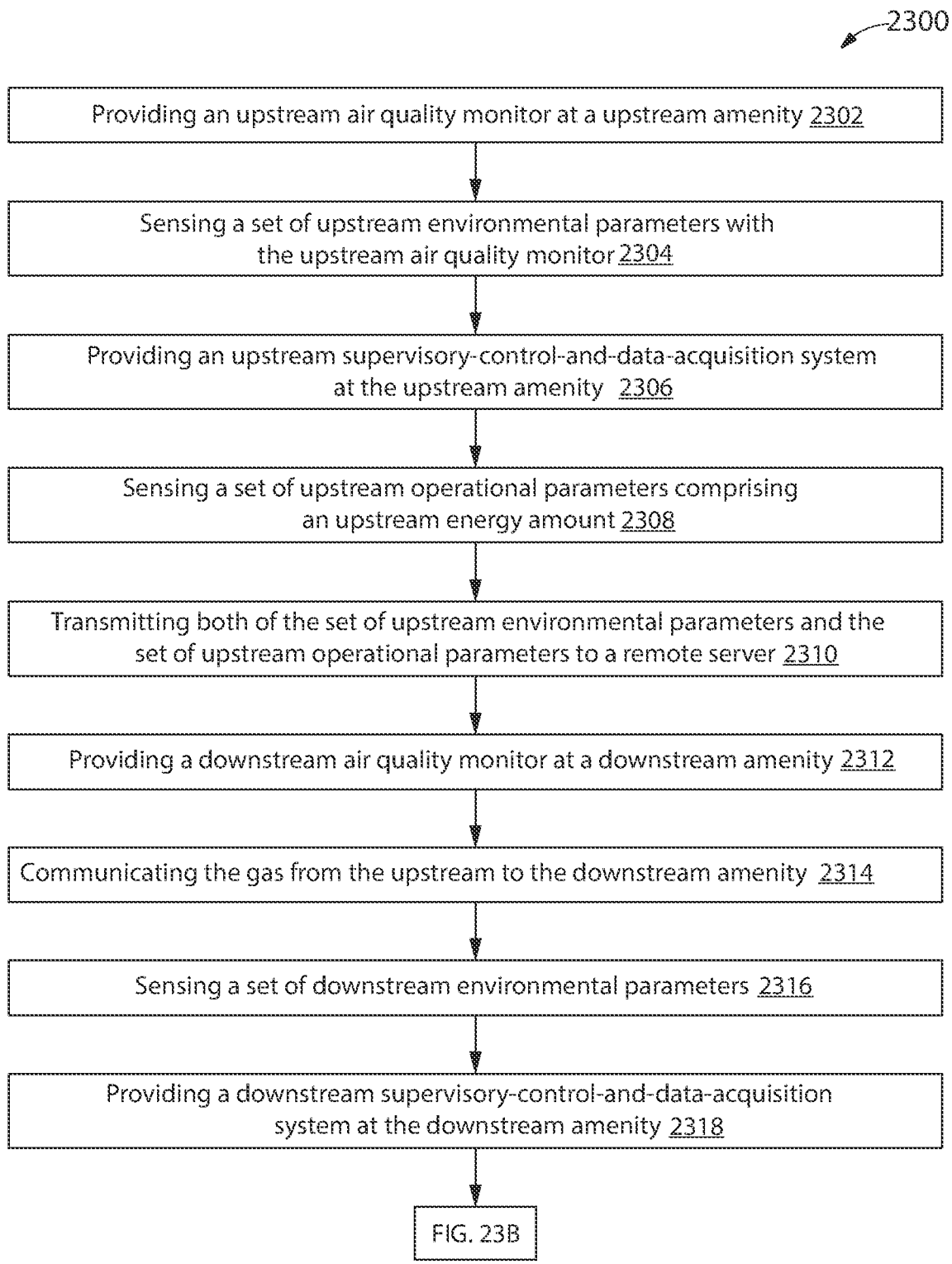

Referring now to FIGS. 23A-23B illustrating a flowchart 2300 of a supply-chain characteristic-vectors securing method for an environmental characteristic-vectors of a gas communicating from an upstream amenity to a downstream amenity. The supply-chain characteristic-vectors securing method may include encryption techniques illustrated in conjunction with FIG. 22.

At step 2302, an air quality monitor 202 may be provided at the upstream amenity 104. As illustrated in FIGS. 2-4, the air quality monitor 202 may include one or more sensors responsive to the gaseous chemical. At step 2304, a set of upstream environmental parameters may be sensed by the air quality monitor 202 positioned at the upstream amenity 104. The upstream environmental parameters may include the concentration of the target gaseous chemical. Additionally, the set of upstream environmental parameters may also include atmospheric characteristics such as barometric pressure, an air temperature, a humidity level, wind direction, or wind speed at the upstream amenity 104.

At step 2306, an upstream SCADA system 1102 may be provided at the upstream amenity 104. The upstream SCADA system 1102 may be connected to at least one device in the upstream amenity 104, which may include but is not limited to pressure sensors, pressure vessels, separators, drills, and the like. The upstream SCADA system 1102 may be configured to monitor and supervise the at least one device at the upstream amenity 104.

At step 2308, the set of upstream operational parameters from the at least one device may be sensed by the upstream SCADA system 1102. The set of operational parameters may include operational parameters, such as pressure obtained from the pressure sensors, or an upstream energy amount, such as energy amount in thermal units associated with the crude oil extracted at the upstream amenity 104.

At step 2310, the set of upstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104 and the downstream amenity 108, may be configured to transmit the associated parameters to a central SCADA system 1702. The central SCADA system 1702 may further transmit the associated parameters to the remote server 1704.

At step 2312, an air quality monitor 202 may be provided at the downstream amenity 108. At step 2314, a set of downstream environmental parameters may be sensed by the air quality monitor 202 positioned at the downstream amenity 108 (the air quality monitor 202 may sometimes referred to herein as set of downstream air quality monitor). The set of downstream environmental parameters may include the concentration of the target gaseous chemical, from the emissions occurring at the downstream amenity 108. Additionally, the set of downstream environmental parameters may also include atmospheric characteristics such as barometric pressure, an air temperature, a humidity level, wind direction, or wind speed at the downstream amenity 108.

At step 2316, processed oil such as gas may be communicated from upstream amenity 104 to downstream amenity 108. The processed oil may be transmitted through communication pathways 110 (illustrated in FIG. 1), using at least one of road transport network 110a, rail transport network 110b, or pipeline network 110c.

At step 2318, a downstream SCADA system 1602 may be provided at the downstream amenity 108. The downstream SCADA system 1602 may be connected and may be configured to monitor and supervise at least one device in the downstream amenity 108, which may include but is not limited to the volumetric capacity of the gas storage units, industrial units, commercial complexes, or households.

At step 2320, the set of downstream operational parameters from the at least one device may be sensed by the downstream SCADA system 1602. The downstream operational parameters may include operational parameters, such as the rate of gas delivery to devices at the downstream amenity 108, and a downstream energy amount, such as the energy amount in thermal units associated with the gas delivered at the downstream amenity 108.

At step 2322, the set of upstream operational parameters and the upstream environmental parameters may be transmitted to the remote server 1704. Particularly, the upstream SCADA system 1102, after obtaining the set of upstream operational parameters and the downstream operational parameters from the upstream amenity 104, may be configured to transmit the associated parameters to a central SCADA system 1702. The central SCADA system 1702 may further transmit the associated parameters to the remote server 1704.

At step 2324, a set of upstream environmental characteristic-vectors from the set of upstream environmental parameters may be calculated. The set of upstream environmental characteristic-vectors may be calculated based on the historical data of the set of environmental parameters sensed in the upstream amenity 104. For example, the atmospheric pressure, air temperature, a humidity level, may be associated over time, to generate the set of upstream environmental characteristic-vectors. Further, at step 2326, the set of upstream environmental characteristic-vectors may be associated with the upstream energy amount. In this step, each of the calculated set of upstream environmental characteristic-vectors may be associated with the energy amount of the extracted crude oil at the upstream amenity 104. For example, the set of environmental characteristic-vectors such as emissions, air temperature, and humidity level may be associated with the energy content of the extracted crude oil.

At step 2328, a set of downstream environmental characteristic-vectors from the set of downstream environmental parameters may be calculated. The set of downstream environmental characteristic-vectors may be calculated based on the historical data of the set of environmental parameters sensed in the downstream amenity 108. For example, the atmospheric pressure, air temperature, a humidity level, may be associated over time, to generate a set of downstream characteristic-vectors of the downstream amenity 108. Further, at step 2330, the set of downstream environmental characteristic-vectors may be associated with the downstream energy amount. In this step, each of the calculated downstream environmental characteristic-vectors from the set of calculated downstream environmental characteristic-vectors may be associated with the energy amount of the processed oil received at the downstream amenity 108. For example, environmental characteristic-vectors such as emissions, air temperature, a humidity level may be associated with the energy content of the processed oil.

At step 2332, the set of upstream environmental characteristic-vectors and the set of downstream environmental characteristic-vectors may be secured, using the encryption technique such as multi-node communication architecture, which is already explained in conjunction with FIG. 22.

Other scenarios, as explained earlier, including the existence of any error, or any anomaly between the upstream environmental characteristic-vectors and the downstream environmental characteristic-vectors, may indicate the loss of crude oil, or processed oil within the oil and gas supply-chain 102, the location of which may be indicated by processing the set of environmental parameters, the set of physical parameters, and the set of operational parameters from the remote server 1704. Such anomalies may increase the likelihood of unsuccessful transactions. Therefore, such scenarios form a genesis for tracking commodities, to reduce increased characteristic-vectors due to the anomalies.

Therefore, in an alternative configuration, a digital twin, or a simulation model may be generated. Output from the simulation model may be analyzed for predicting insights on the set of environmental parameters or the characteristic-vectors, such that a scenario determining minimal environmental characteristic-vectors, and a communication path associated with the minimal environmental characteristic-vectors between the upstream amenity 104 and the downstream amenity 108, may be determined accordingly.

Figure 24:
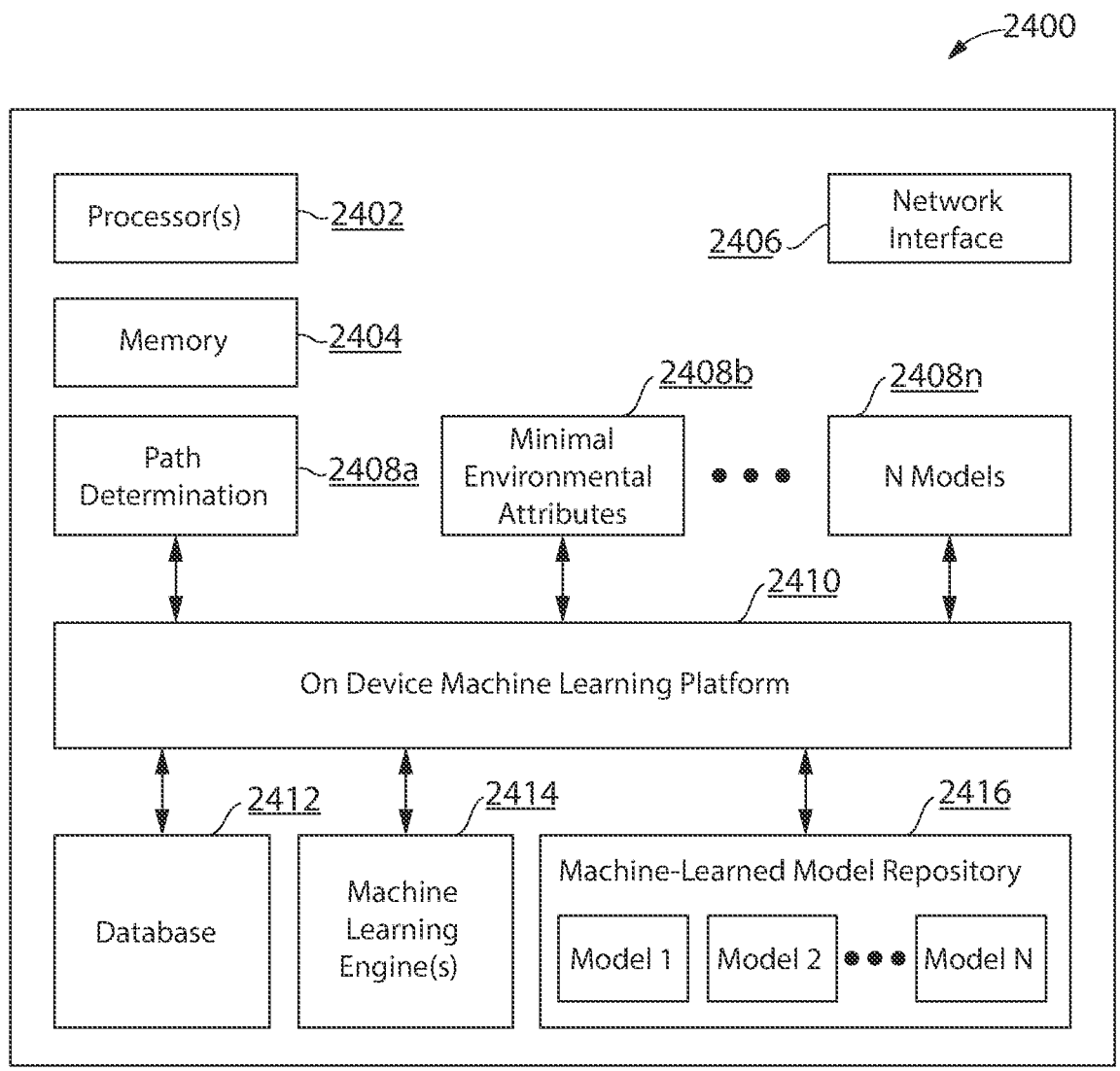
FIG. 24 illustrates a layout of a machine-learning model generation system for the oil and gas supply-chain.

Referring now to FIG. 24 illustrating a layout 2400 of a machine-learning model generation system for the oil and gas supply-chain 102 may be illustrated. The machine-learning model generation system may be embedded in the centralized computing unit 1802, as an on-device machine-learning unit configured to enable on-device prediction, training, example collection, and/or other machine-learning tasks or functionality for determining minimal environmental characteristic-vectors, and a communication path associated with the minimal environmental characteristic-vectors between the upstream amenity 104 and the downstream amenity 108.

The machine-learning model generation system may include a processor 2402 and a memory 2404. The processor 2402 may include any suitable processing device (e.g., a processor core, a microprocessor, an ASIC, an FPGA, a controller, a microcontroller, etc.) and can be one processor or a plurality of processors that may be operatively connected. The memory 2404 can include one or more non-transitory computer-readable storage mediums, such as RAM, ROM, EEPROM, EPROM, flash memory devices, magnetic disks, etc., and combinations thereof. The memory 2404 may store data and instructions which are executed by the processor 2402 to cause the machine-learning model generation system to train models, using a variety of data. The machine-learning model generation system may also include a network interface 2406 that may enable communication over one or more networks (e.g., the Internet).

The machine-learning platform 2410 may be configured to generate an on-device prediction, training, example collection, and/or other machine-learning tasks or functionality, which may be hereinafter collectively referred to as "machine learning functions 2408*n*". The machine-learning functions may be in a form of machine-learning models stored locally on the machine-learning model generation system. The machine learning functions 2408*n* may include environmental-characteristic-vectors minimizing model 2408*b*, and a communication path determining model 2408*a*, in the oil and gas supply-chain 102. The machine learning models may be based on a gradient tree-boosting algorithm. In particular, the machine learning models may utilize a FastTreeTweedie algorithm in the ML.NET framework. Alternative machine learning models such as simple-stress regression models could be used, but the gradient tree-boosting algorithm (decision tree) ensembles may provide better performance and may therefore be preferred. Further, other alternative machine learning models may include common regression models, linear regression models (e.g., ordinary least squares, gradient descent, regularization), decision trees and tree ensembles (e.g., random forest, bagging, boosting), generalized additive models, support vector machines, and artificial neural networks, among others. The machine learning models may be used to identify the emission sources and also to isolate the correlation between elevated concentrations and atmospheric variables. For example, a machine learning model configured as a tree-based model with a gradient tree-boosting algorithm may be trained with 10 leaves and 300 trees. The machine learning functions may be trained daily for each of the upstream amenity 104, the midstream amenity 106, and the downstream amenity 108 for up to 90 days of data.

The processor 2402 may be connected to the remote server 1704 and may be configured to obtain the upstream environmental characteristic-vectors, the midstream environmental characteristic-vectors, and the downstream environmental characteristic-vectors. Further, the machine-learning platform 2410 may be configured to train at least one model using a machine-learning engine 2414, to minimize the environmental characteristic-vectors using the environmental characteristic-vectors minimizing model 2408*b*, or determine a communication path using the communication path determining model 2408*a*. For example, to minimize the environmental characteristic-vectors, the machine-learning platform 2410 may be configured to train the environmental characteristic-vectors minimizing model 2408*b* by obtaining the upstream environmental characteristic-vectors, the midstream environmental characteristic-vectors, and the downstream environmental characteristic-vectors from the processor 2402. As explained earlier, the machine learning function of environmental characteristic-vectors minimizing model 2408*b* may be based on the Regression model, which uses regression analysis. Regression analysis estimates relationships among variables. Intended for continuous data that can be assumed to follow a normal distribution, the analysis finds key patterns in large data sets and is often used to determine how much specific factors, such as emissions, influence the movement of the processed oil through the communication pathways 110. With regression analysis, an emission, or any parameter from the upstream environmental characteristic-vectors or the downstream environmental characteristic-vectors may be predicted, and an independent variable may be used to determine an outcome, i.e., the influence of the predicted emission on the movement of the processed oil through the communication pathways 110.

Using the predicted parameter of the emission, or any parameter from the upstream environmental characteristic-vectors or the downstream environmental characteristic-vectors, a digital twin of the oil and gas supply-chain 102, or a simulation model of the oil and gas supply-chain 102 may be generated by the centralized computing unit 1802. The digital twin or the simulation model may represent environmental-characteristic-vectors-minimizing-simulation-model, configured to forecast the set of upstream environmental characteristic-vectors, the set of midstream environmental characteristic-vectors, and the set of downstream environmental characteristic-vectors to generate simulated set of upstream environmental characteristic-vectors, a simulated set of midstream environmental characteristic-vectors, and simulated set of downstream environmental characteristic-vectors which may be analyzed as such that mitigation of events related to the anomaly, such as a leak, may be prepared accordingly, thus minimizing or reducing the environmental characteristic-vectors.

In an exemplary configuration, the predicted values or the upstream environmental characteristic-vectors, the midstream environmental characteristic-vectors, the downstream environmental characteristic-vectors, and the simulation model associated therewith may be generated by the centralized computing unit 1802. For example, the machine-learning platform 2410 may be configured to analyze the minimized environmental characteristic-vectors across the oil and gas supply-chain 102, and train a communication-path-machine-learning-model for generating a communication-path-machine-learning-model parameter. Using the communication-path-machine-learning-model parameter, a communication-path-simulation-model may be generated, which may be configured to generate a simulated set of upstream environmental characteristic-vectors, a simulated set of midstream environmental characteristic-vectors, and simulated set of downstream environmental characteristic-vectors. These simulated set of environmental characteristic-vectors may be analyzed to determine a communication path with minimal characteristic-vectors. The communication-path-machine-learning-model may also be based on, as explained earlier, the regression analysis machine-learning model.

As may be appreciated, and explained earlier, the machine learning functions may be trained daily for each of the upstream amenity 104, the midstream amenity 106, and the downstream amenity 108 for up to 90 days, i.e., the training may be refined every passing day to reflect and record change in the environmental characteristic-vectors. Accordingly, the predicted parameter may also be refined, to generate updated set of upstream environmental parameters, updated set of midstream environmental parameters, and updated set of downstream environmental parameters. Using these updated set of parameters, the centralized computing unit 1802 may further generate a refined set of upstream environmental characteristic-vectors, a refined set of midstream characteristic-vectors, and a refined set of downstream environmental characteristic-vectors. Further, the digital twin or the simulation model may also be refined, i.e., to generate a refined communication-path-simulation-model, and refined environmental-characteristic-vectors-minimizing-simulation-model. The refined communication-path-simulation-model, and refined environmental-characteristic-vectors-minimizing-simulation-model may be configured to generate the refined set of simulated upstream environmental characteristic-vectors, the refined set simulated midstream environmental characteristic-vectors, and the refined set of simulated downstream environmental characteristic-vectors. Therefore, refining the simulation model, iteratively, may enhance the preparation for the mitigation of the anomalies occurring in the oil and gas supply-chain 102. After refining, the refined simulated upstream environmental characteristic-vectors, the refined simulated midstream environmental characteristic-vectors, and the refined simulated downstream environmental characteristic-vectors, and any refined simulation model associated therewith may be stored in a database 2412. Further, the trained machine-learning models may be stored in the machine-learning model repository 2416.

Figure 25A:
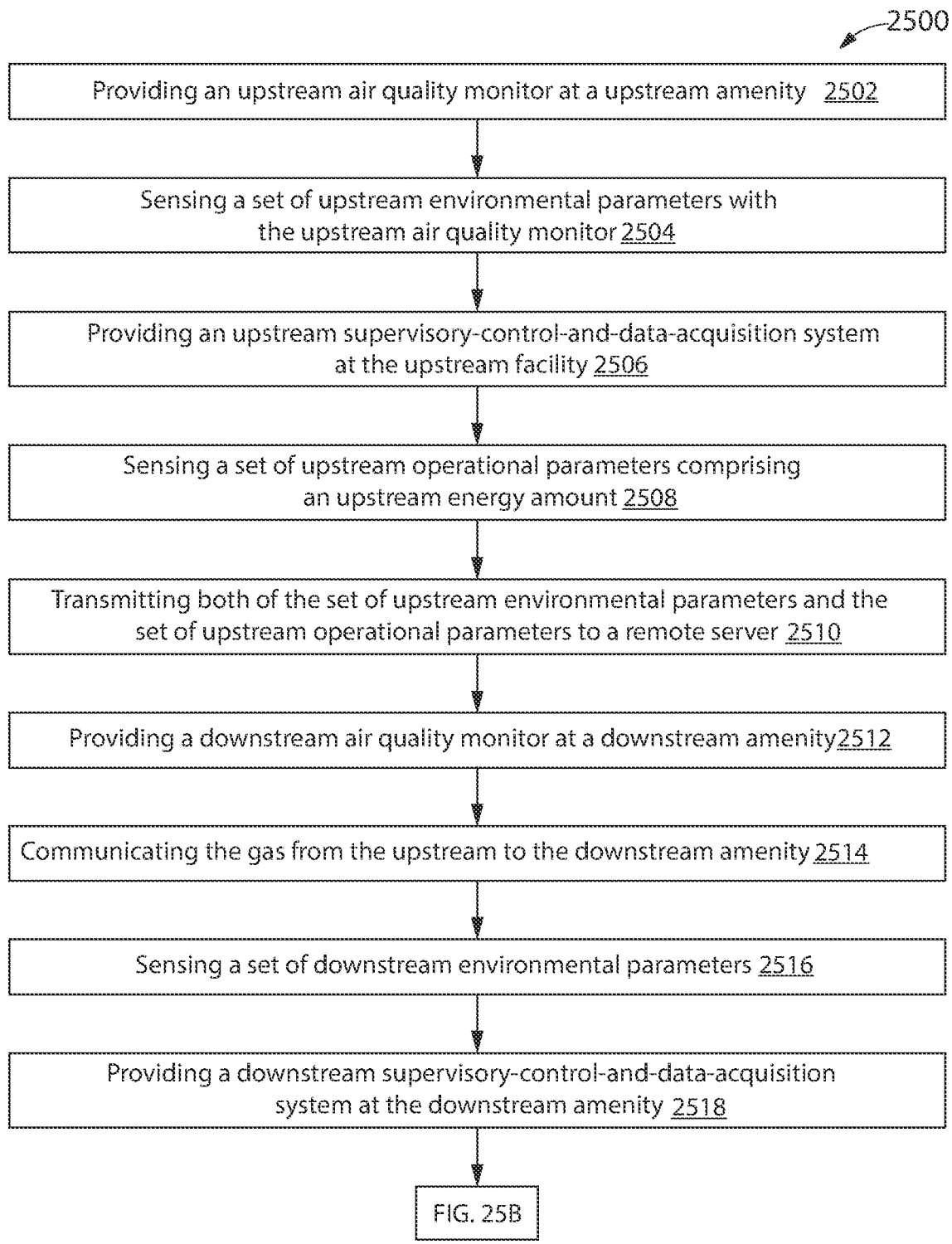

Now referring to FIG. 25A-25B illustrating a flow chart 2500 of a supply-chain characteristic-vectors minimizing method for minimizing environmental characteristic-vectors of a gas communicating from an upstream amenity 104 to a downstream amenity 108, using the supply-chain characteristic-vectors minimizing system including the supply-chain characteristic-vectors model. At step 2502, an air quality monitor 202 may be provided at the upstream amenity 104. As illustrated in FIGS. 2-4, the air quality monitor 202 may include one or more sensors responsive to the gaseous chemical. At step 2504, a set of upstream environmental parameters may be sensed by the air quality monitor 202 positioned at the upstream amenity 104. The set of upstream environmental parameters may include the concentration of the target gaseous chemical. Additionally, the set of upstream environmental parameters may also include atmospheric characteristics such as atmospheric pressure, an air temperature, a humidity level, wind direction, or wind speed at the upstream amenity 104.

At step 2506, an upstream SCADA system 1102 may be provided at the upstream amenity 104. The upstream SCADA system 1102 may be connected to at least one device in the upstream amenity 104, which may include but is not limited to pressure sensors, pressure vessels, separators, drills, and the like. The upstream SCADA system 1102 may be configured to monitor and supervise at the least one device at the upstream amenity 104.

At step 2508, a set of upstream operational parameters from the at least one device may be sensed by the upstream SCADA system 1102. The set of operational parameters may include operational parameters, such as pressure obtained from the pressure sensors, or an upstream energy amount, such as energy amount in thermal units associated with the crude oil extracted at the upstream amenity 104.

At step 2510, the set of upstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104 and the downstream amenity 108, may be configured to transmit the associated parameters to a central SCADA system 1702. The central SCADA system 1702 may further transmit the associated parameters to the remote server 1704.

At step 2512, an air quality monitor 202 may be provided at the downstream amenity 108. At step 2514, a set of downstream environmental parameters may be sensed by the air quality monitor 202 positioned at the downstream amenity 108 (the air quality monitor 202 may sometimes referred to herein as set of downstream air quality monitor). The set of downstream environmental parameters may include the concentration of the target gaseous chemical, from the emissions occurring at the downstream amenity 108. Additionally, the set of downstream environmental parameters may also include atmospheric characteristics such as barometric pressure, an air temperature, a humidity level, wind direction, or wind speed at the downstream amenity 108.

At step 2516, processed oil such as gas may be communicated from upstream amenity 104 to downstream amenity 108. The processed oil may be transmitted through communication pathways 110 (illustrated in FIG. 1), using at least one of road transport network 110a, rail transport network 110b, or pipeline network 110c.

At step 2518, a midstream SCADA system 1502 may be provided at the downstream amenity 108. The downstream SCADA system 1602 may be connected and may be configured to monitor and supervise at least one device in the downstream amenity 108, which may include but is not limited to the volumetric capacity of the gas storage units, industrial units, commercial complexes, or households.

At step 2520, the set of downstream operational parameters from the at least one device may be sensed by the downstream SCADA system 1602. The set of downstream operational parameters may include operational parameters, such as the rate of gas delivery to devices at the downstream amenity 108, and a downstream energy amount, such as the energy amount in thermal units associated with the gas delivered at the downstream amenity 108.

At step 2522, the set of upstream operational parameters and the set of upstream environmental parameters may be transmitted to the remote server 1704. Particularly, the upstream SCADA system 1102, after obtaining the set of upstream operational parameters and the downstream operational parameters from the upstream amenity 104 and the downstream amenity 108, may be configured to transmit the associated parameters to a central SCADA system 1702. The central SCADA system 1702 may further transmit the associated parameters to the remote server 1704.

At step 2524, a set of upstream environmental characteristic-vectors from the set of upstream environmental parameters may be calculated. The set of upstream environmental characteristic-vectors may be calculated based on the historical data of the set of environmental parameters sensed in the upstream amenity 104. For example, the atmospheric pressure, air temperature, and a humidity level, may be associated over time, to generate the set of upstream characteristic-vectors of the environment of the upstream amenity 104. Further, at step 2526, the set of upstream environmental characteristic-vectors may be associated with the upstream energy amount. In this step, each of the calculated set of upstream environmental characteristic-vectors may be associated with the energy amount of the extracted crude oil at the upstream amenity 104. For example, the set of environmental characteristic-vectors such as emissions, air temperature, and humidity level may be associated with the energy content of the extracted crude oil.

At step 2528, a set of downstream environmental characteristic-vectors from the set of downstream environmental parameters may be calculated. The set of downstream environmental characteristic-vectors may be calculated based on the historical data of the set of environmental parameters sensed in the downstream amenity 108. For example, the atmospheric pressure, air temperature, and humidity level may be associated over time, to generate the set of downstream characteristic-vectors of the environment of the downstream amenity 108. Further, at step 2530, the set of downstream environmental characteristic-vectors may be associated with the downstream energy amount. In this step, each of the calculated set of downstream environmental characteristic-vectors may be associated with the downstream energy amount received at the downstream amenity 108. For example, the set of downstream environmental characteristic-vectors such as emissions, air temperature, and humidity level may be associated with the energy content of the processed oil.

At step 2532, an environmental-characteristic-vectors-minimizing machine-learning-model may be trained to generate a minimizing environmental-characteristic-vectors-minimizing-machine-learning-model parameter, such as predicted environmental-characteristic-vectors for the upstream amenity 104, the midstream amenity 106, and the downstream amenity 108, respectively. As explained earlier, the environmental-characteristic-vectors-machine-learning model may be based on a linear regression model, configured to generate predicted environmental characteristic-vectors and an influence thereof, on the transportation of crude oil and processed oil throughout the oil and gas supply-chain 102.

At step 2534, an environmental-characteristic-vectors-minimizing simulation model may be generated, which may act as a digital twin of the oil and gas supply-chain 102. The environmental-characteristic-vectors-minimizing simulation model may be configured to forecast any change in the trend of the environmental characteristic-vectors with respect to the upstream amenity 104, the midstream amenity 106, and the downstream amenity 108. At step 2536, the environmental characteristic-vectors for the upstream amenity 104, the midstream amenity 106, and the downstream amenity 108 may be minimized, such that mitigating events related to the anomaly, like a leak, may be prepared accordingly.

Figure 26A:
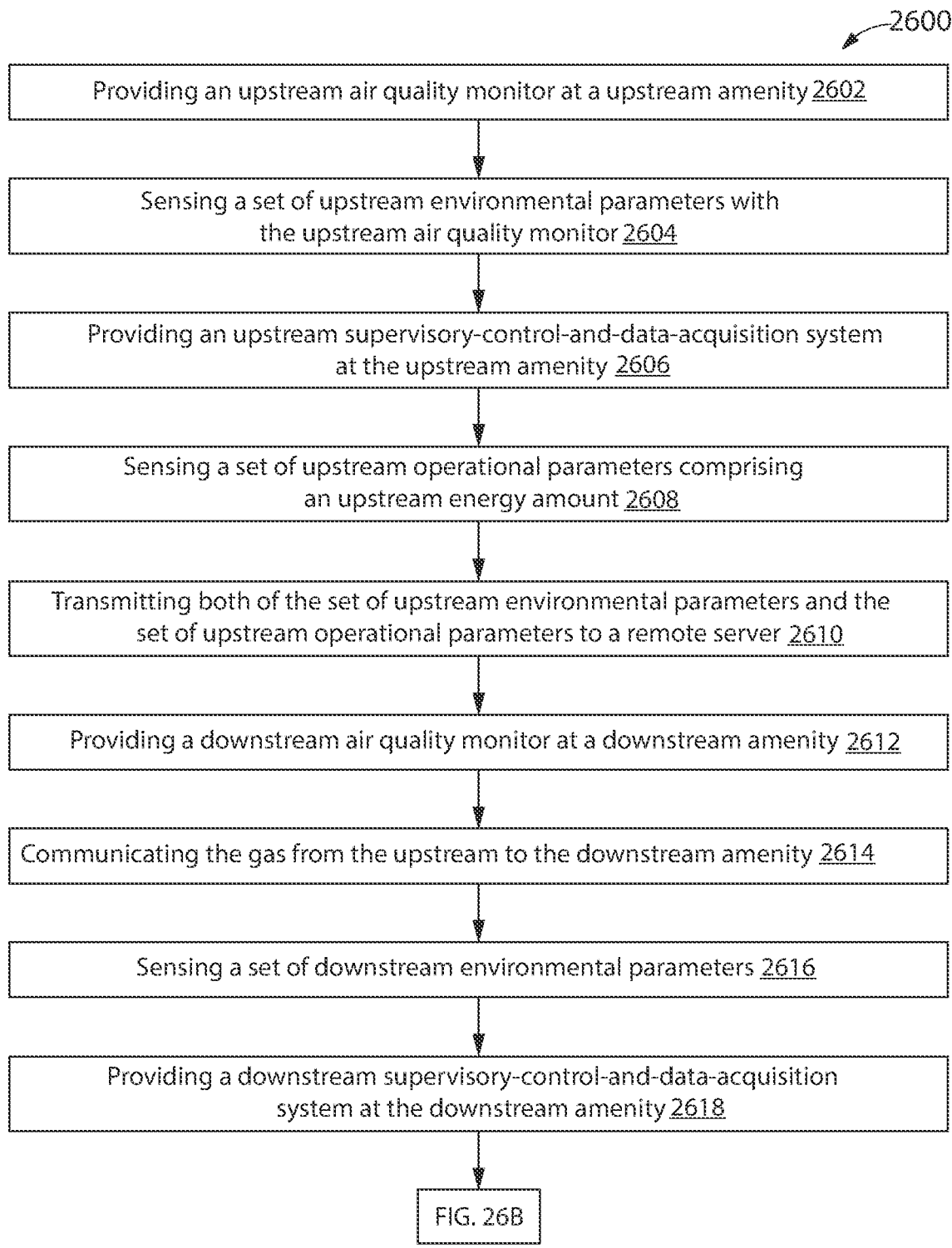

Now referring to FIG. 26A-26B, a flowchart 2600 of a supply-chain communication path determining method for a gas communicating from an upstream amenity 104 to a downstream amenity 108 may be illustrated, using the supply-chain communication path determining system which may include supply-chain communication path machine-learning model. At step 2602, an air quality monitor 202 may be provided at the upstream amenity 104. As illustrated in FIGS. 2-4, the air quality monitor 202 may include one or more sensors responsive to the gaseous chemical. At step 2604, a set of upstream environmental parameters may be sensed by the air quality monitor 202 positioned at the upstream amenity 104. The upstream environmental parameters may include the concentration of the target gaseous chemical. Additionally, the set of upstream environmental parameters may also include atmospheric characteristics such as barometric pressure, an air temperature, a humidity level, wind direction, or wind speed at the upstream amenity 104.

At step 2606, an upstream SCADA system 1102 may be provided at the upstream amenity 104. The upstream SCADA system 1102 may be connected to at least one device in the upstream amenity 104, which may include but is not limited to pressure sensors, pressure vessels, separators, drills, and the like. The upstream SCADA system 1102 may be configured to monitor and supervise at the least one device at the upstream amenity 104.

At step 2608, the set of upstream operational parameters from the at least one device may be sensed by the upstream SCADA system 1102. The set of operational parameters may include operational parameters, such as pressure obtained from the pressure sensors, or an upstream energy amount, such as energy amount in thermal units associated with the crude oil extracted at the upstream amenity 104.

At step 2610, the set of upstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104 and the downstream amenity 108, may be configured to transmit the associated parameters to a central SCADA system 1702. The central SCADA system 1702 may further transmit the associated parameters to the remote server 1704.

At step 2612, an air quality monitor 202 may be provided at the downstream amenity 108. At step 2614, a set of downstream environmental parameters may be sensed by the air quality monitor 202 positioned at the downstream amenity 108 (the air quality monitor 202 may sometimes referred to herein as set of downstream air quality monitor). The set of downstream environmental parameters may include the concentration of the target gaseous chemical, from the emissions occurring at the downstream amenity 108. Additionally, the set of downstream environmental parameters may also include atmospheric characteristics such as barometric pressure, an air temperature, a humidity level, wind direction, or wind speed at the downstream amenity 108.

At step 2616, processed oil such as gas may be communicated from upstream amenity 104 to downstream amenity 108. The processed oil may be transmitted through communication pathways 110 (illustrated in FIG. 1), using at least one of road transport network 110a, rail transport network 110b, or pipeline network 110c.

At step 2618, a downstream SCADA system 1602 may be provided at the downstream amenity 108. The downstream SCADA system 1602 may be connected and may be configured to monitor and supervise at least one device in the downstream amenity 108, which may include but is not limited to the volumetric capacity of the gas storage units, industrial units, commercial complexes, or households.

At step 2620, the set of downstream operational parameters from the at least one device may be sensed by the downstream SCADA system 1602. The set of downstream operational parameters may include operational parameters, such as the rate of gas delivery to devices at the downstream amenity 108, and a downstream energy amount, such as the energy amount in thermal units associated with the gas delivered at the downstream amenity 108.

At step 2622, the set of downstream operational parameters and the set of upstream environmental parameters may be transmitted to the remote server 1704. Particularly, the upstream SCADA system 1102, after obtaining the set of upstream operational parameters and the set of downstream operational parameters from the upstream amenity 104, may be configured to transmit the associated parameters to a central SCADA system 1702. The central SCADA system 1702 may further transmit the associated parameters to the remote server 1704.

At step 2624, a set of upstream environmental characteristic-vectors from the set of upstream environmental parameters may be calculated. The set of environmental characteristic-vectors may be calculated based on the historical data of the set of environmental parameters sensed in the upstream amenity 104. For example, the atmospheric pressure, air temperature, and a humidity level, may be associated over time, to generate the set of characteristic-vectors of the environment at the upstream amenity 104. Further, at step 2626, the set of upstream environmental characteristic-vectors may be associated with the upstream energy amount. In this step, each of the calculated upstream environmental characteristic-vectors from the calculated upstream environmental characteristic-vectors may be associated with the energy amount of the extracted crude oil at the upstream amenity 104. For example, the set of environmental characteristic-vectors such as emissions, air temperature, and a humidity level may be associated with the energy content of the extracted crude oil.

At step 2628, a set of downstream environmental characteristic-vectors from the set of downstream environmental parameters may be calculated. The set of downstream environmental characteristic-vectors may be calculated based on the historical data of the set of environmental parameters sensed in the downstream amenity 108. For example, the atmospheric pressure, air temperature, and a humidity level, may be associated over time, to generate the set of characteristic-vectors of the environment at the downstream amenity 108. Further, at step 2630, the set of downstream environmental characteristic-vectors may be associated with the set of downstream energy amount. In this step, each of the calculated set of downstream environmental characteristic-vectors may be associated with the energy amount of the processed oil received at the downstream amenity 108. For example, the set of environmental characteristic-vectors such as emissions, air temperature, and a humidity level may be associated with the energy content of the processed oil.

At step 2632, a communication-path-machine-learning-model may be trained to generate a communication-path-machine-learning-model parameter, such as predicted environmental characteristic-vectors for the upstream amenity 104, the midstream amenity 106, and the downstream amenity 108, respectively. As explained earlier, the communication-path-machine-learning model may be based on a linear regression model, configured to generate predicted environmental characteristic-vectors and an influence thereof, on the transportation of crude oil and processed oil throughout the oil and gas supply-chain 102.

At step 2634, a communication-path simulation model may be generated, which may act as a digital twin of the oil and gas supply-chain 102. The communication-path simulation model may be configured communication-path-simulation-model is configured to generate a simulated set of upstream environmental characteristic-vectors and a simulated set of downstream environmental characteristic-vectors. At step 2636, the communication path with communication path with minimal upstream environmental characteristic-vectors and a minimal downstream environmental characteristic-vectors, by analyzing the simulated set of upstream environmental characteristic-vectors and the simulated set of downstream environmental characteristic-vectors may be determined.

In another alternative configuration, the present supply-chain may be configured for other commodities in physical form (e.g. gas, liquid, or solid). Non-limiting examples may include the movement of ice that may be in solid form or contained in a mixture of liquid water with ice distributed therein. Or, the supply-chain may be moving produce (such as apples from growing regions of the US, bananas from tropical regions to markets in Europe, fish from net-farms in the pacific ocean for consumption in Chicago, Illinois, or any of an infinitely larger number of applications). When alternatively configured (outside the illustrated application to oil and/or natural gas), the items travelling through the supply-chain may benefit from tracking/trading/reporting characteristic-vectors such as an atmospheric pressure, an atmospheric temperature, a humidity level, composition of airborne pollutants in atmosphere, volume of uncontained water in the gas, volume of uncontained liquid petroleum in the gas, a predefined scarred land of an amenity site of the upstream amenity, a usage of water, a usage of topsoil, a usage of nutrients, a type of nutrients, a grade of slope of the land, proximity of a river, depth of a water table (e.g. aquifer), proximity of endangered species, proximity of human habitat/domicile, etc. In some configurations, air quality monitors might not be utilized and/or be replaced with other monitors contiguously dispersed, intermittently dispersed, or terminally located (at end or beginning points) along the supply-chain. Along similar lines, a SCADA system may be replaced by other analog or digital monitoring/reporting/controlling systems.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical characteristic-vectors (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed:

1. A supply-chain characteristic-vectors minimizing method for an environmental characteristic-vectors of a gas transmitting from an upstream amenity to a downstream amenity, the supply-chain characteristic-vectors minimizing method comprising:

providing an upstream air quality monitor at the upstream amenity, the upstream air quality monitor comprising:
a first sensor responsive to a target substance;
sensing a set of upstream environmental parameters with the upstream air quality monitor;
providing an upstream SCADA system at the upstream amenity;
sensing a set of upstream operational parameters with the upstream SCADA system, the set of upstream operational parameters comprising:
an upstream energy amount;
transmitting both the set of upstream environmental parameters and the set of upstream operational parameters to a remote server;
providing a downstream air quality monitor at the downstream amenity, the downstream air quality monitor comprising:
a second sensor responsive to the target substance;
transmitting the gas from the upstream amenity to the downstream amenity;
sensing a set of downstream environmental parameters with the downstream air quality monitor;
providing a downstream SCADA system at the downstream amenity;
sensing a set of downstream operational parameters with the downstream SCADA system, the set of downstream operational parameters comprising:
a downstream energy amount;
transmitting both the set of downstream environmental parameters and the set of downstream operational parameters to the remote server;
calculating a set of upstream environmental characteristic-vectors from the set of upstream environmental parameters;
associating the set of upstream environmental characteristic-vectors to the upstream energy amount;

calculating a set of downstream environmental characteristic-vectors from the set of downstream environmental parameters;

associating the set of downstream environmental characteristic-vectors with the downstream energy amount;

training an environmental-characteristic-vectors-minimizing-machine-learning-model, wherein the environmental-characteristic-vectors-minimizing-machine-learning-model is capable of:

generating an environmental-characteristic-vectors-minimizing-machine-learning-model parameter for the upstream amenity and the downstream amenity with the environmental-characteristic-vectors-minimizing-machine-learning-model;

generating an environmental-characteristic-vectors-minimizing-simulation-model of the set of upstream environmental characteristic-vectors and the set of downstream environmental characteristic-vectors using the environmental-characteristic-vectors-minimizing-machine-learning-model parameter;

generating a set of simulated upstream environmental characteristic-vectors and a set of simulated downstream environmental characteristic-vectors of the downstream amenity with the environmental-characteristic-vectors-minimizing-simulation-model; and minimizing the set of upstream environmental characteristic-vectors and the set of downstream environmental characteristic-vectors, by analyzing the set of simulated upstream environmental characteristic-vectors and the set of simulated downstream environmental characteristic-vectors of the downstream amenity.

2. The supply-chain characteristic-vectors minimizing method of claim 1 and further comprising:

monitoring, over a predefined time period, the set of upstream environmental parameters to generate an updated set of upstream environmental parameters;

updating the set of upstream environmental characteristic-vectors using the updated set of upstream environmental parameters to a refined set of upstream environmental characteristic-vectors;

monitoring, over a predefined time period, the set of downstream environmental parameters to generate an updated set of downstream environmental parameters;

updating the set of downstream environmental characteristic-vectors using the updated set of downstream environmental parameters to a refined set of downstream environmental characteristic-vectors;

refining the environmental-characteristic-vectors-minimizing-simulation-model using the refined set of upstream environmental characteristic-vectors and the refined set of downstream environmental characteristic-vectors to generate a refined environmental-characteristic-vectors-minimizing-simulation-model;

generating a refined set of simulated upstream environmental characteristic-vectors and a refined set of simulated downstream environmental characteristic-vectors of the downstream amenity with the refined environmental-characteristic-vectors-minimizing-simulation-model; and minimizing the set of upstream environmental characteristic-vectors and the set of downstream environmental characteristic-vectors, by analyzing the refined set of simulated upstream environmental characteristic-vectors and the refined set of simulated downstream environmental characteristic-vectors.

3. The supply-chain characteristic-vectors minimizing method of claim 1 and further comprising:

sensing a set of upstream physical parameters with the upstream SCADA system at the upstream amenity;

sensing a set of downstream physical parameters with the downstream SCADA system at the downstream amenity; and transmitting the set of upstream physical parameters and the set of downstream physical parameters to the remote server.

4. The supply-chain characteristic-vectors minimizing method of claim 3 and further comprising:

calculating a set of upstream physical characteristic-vectors with the set of upstream physical parameters at the upstream amenity; and calculating a set of downstream physical characteristic-vectors with the set of downstream physical parameters at the downstream amenity.

5. The supply-chain characteristic-vectors minimizing method of claim 4 and further comprising:

associating the set of upstream physical characteristic-vectors with the upstream energy amount; and associating the set of downstream physical characteristic-vectors with the downstream energy amount.

6. The supply-chain characteristic-vectors minimizing method of claim 3, wherein the set of upstream physical parameters comprises:

a location of an amenity site of the upstream amenity; and a volumetric flow rate, and a pressure at which the upstream energy amount is transmitted to the downstream amenity.

7. The supply-chain characteristic-vectors minimizing method of claim 3, wherein the set of downstream physical parameters comprises:

a location of an amenity site of the downstream amenity; and a volumetric flow rate, and a pressure at which the downstream energy amount is received at the downstream amenity.

8. The supply-chain characteristic-vectors minimizing method of claim 1, wherein the set of upstream environmental characteristic-vectors comprises at least one of:

at the upstream amenity:
an atmospheric pressure,
an atmospheric temperature,
a humidity level,
composition of airborne pollutants in atmosphere;
volume of uncontained water in the gas,
volume of uncontained liquid petroleum in the gas, and
a predefined scarred land of an amenity site of the upstream amenity.

9. The supply-chain characteristic-vectors minimizing method of claim 1, wherein the set of downstream environmental characteristic-vectors comprises at least one of:

at the downstream amenity:
composition of airborne pollutants in atmosphere;
volume of uncontained water in the gas,
volume of uncontained liquid petroleum in the gas, and
a predefined scarred land of an amenity site of the downstream amenity.

10. The supply-chain characteristic-vectors minimizing method of claim 1, wherein each of the upstream energy amount and the downstream energy amount are at least one of:

an energy unit associated with a volumetric flow rate of the gas.

11. The supply-chain characteristic-vectors minimizing method of claim 1 and further comprising:
  identifying a functional anomaly comprising at least one of:
    loss of the upstream energy amount between the upstream amenity and the downstream amenity, and
    malfunctioning at one of or in-between the upstream amenity and the downstream amenity.

12. The supply-chain characteristic-vectors minimizing method of claim 1 and further comprising:
  stationing a midstream amenity, the midstream amenity comprising:
    at least one device comprising any one of:
      an energy supply pipeline connecting the upstream amenity and the downstream amenity,
      a pre-processing unit connected to the upstream amenity and installed on the energy supply pipeline; and
      a receiving unit located in the downstream amenity and connected to the energy supply pipeline.

13. The supply-chain characteristic-vectors minimizing method of claim 12 and further comprising:
  providing a midstream SCADA system at the midstream amenity;
  sensing a set of midstream operational parameters with the midstream SCADA system, the set of upstream operational parameters comprising:
    a midstream energy amount; and
  transmitting the set of midstream operational parameters to the remote server.

14. A supply-chain characteristic-vectors minimizing system for an environmental characteristic-vectors of a gas transmitting from an upstream amenity to a downstream amenity, the supply-chain characteristic-vectors minimizing system comprising:
  an upstream air quality monitor installed at the upstream amenity, the upstream air quality monitor comprising:
    a first sensor responsive to a target substance;
    wherein the upstream air quality monitor:
      senses a set of upstream environmental parameters;
  an upstream SCADA system installed at the upstream amenity, wherein the upstream SCADA system:
    senses a set of upstream operational parameters, the set of upstream operational parameters comprising:
      an upstream energy amount; and
    transmits both the set of upstream environmental parameters and the set of upstream operational parameters to a remote server;
  a downstream air quality monitor installed at the downstream amenity, the downstream air quality monitor comprising:
    a second sensor responsive to the target substance;
    wherein the downstream air quality monitor:
      senses a set of downstream environmental parameters;
  a downstream SCADA system installed at the downstream amenity, wherein the downstream SCADA system:
    senses a set of downstream operational parameters, the set of downstream operational parameters comprising:
      a downstream energy amount; and
    transmits both the set of downstream environmental parameters and the set of downstream operational parameters to the remote server; and
  a processing unit connected to the remote server, wherein the processing unit:
    calculates a set of upstream environmental characteristic-vectors from the set of upstream environmental parameters;
    associates the set of upstream environmental characteristic-vectors to the upstream energy amount;
    calculates a set of downstream environmental characteristic-vectors from the set of downstream environmental parameters;
    associates the set of downstream environmental characteristic-vectors with the downstream energy amount;
    trains an environmental-characteristic-vectors-minimizing-machine-learning-model, wherein the environmental-characteristic-vectors-minimizing-machine-learning-model:
      generates an environmental-characteristic-vectors-minimizing-machine-learning-model parameter for the upstream amenity and the downstream amenity;
      generates an environmental-characteristic-vectors-minimizing-simulation-model of the set of upstream environmental characteristic-vectors and the set of downstream environmental characteristic-vectors using the environmental-characteristic-vectors-minimizing-machine-learning-model parameter, wherein the environmental-characteristic-vectors-minimizing-simulation-model:
        generates a simulated upstream environmental characteristic-vectors and a simulated downstream environmental characteristic-vectors; and
      minimizes the set of upstream environmental characteristic-vectors and the set of downstream environmental characteristic-vectors, by analyzing the simulated upstream environmental characteristic-vectors and the simulated downstream environmental characteristic-vectors.

15. The supply-chain characteristic-vectors minimizing system of claim 14, wherein the processing unit is configured to:
  monitor, over a predefined time period, the set of upstream environmental parameters to generate an updated set of upstream environmental parameters;
  update the set of upstream environmental characteristic-vectors using the updated set of upstream environmental parameters to a refined set of upstream environmental characteristic-vectors;
  monitor, over a predefined time period, the set of downstream environmental parameters to generate an updated set of downstream environmental parameters;
  update the set of downstream environmental characteristic-vectors using the updated set of downstream environmental parameters to a refined set of downstream environmental characteristic-vectors;
  refine the environmental-characteristic-vectors-minimizing-simulation-model using the refined set of upstream environmental characteristic-vectors and the refined set of downstream environmental characteristic-vectors to generate a refined environmental-characteristic-vectors-minimizing-simulation-model, wherein the refined environmental-characteristic-vectors-minimizing-simulation-model generates:
    a refined set of simulated upstream environmental characteristic-vectors and a refined set of simulated downstream environmental characteristic-vectors; and minimize the set of upstream environmental characteristic-vectors and the set of downstream environmental characteristic-vectors, by analyzing the refined set of simulated upstream environmental characteristic-vectors and the refined set of simulated downstream environmental characteristic-vectors of the downstream amenity.

16. The supply-chain characteristic-vectors minimizing system of claim 14, wherein:
the upstream SCADA system senses a set of upstream physical parameters at the upstream amenity;
the downstream SCADA system senses a set of downstream physical parameters at the downstream amenity; and
the upstream SCADA system and the downstream SCADA system transmits the set of upstream physical parameters and the set of downstream physical parameters to the remote server.

17. The supply-chain characteristic-vectors minimizing system of claim 16, wherein the processing unit is configured to:
calculate a set of upstream physical characteristic-vectors with the set of upstream physical parameters at the upstream amenity; and
calculate a set of downstream physical characteristic-vectors with the set of downstream physical parameters at the downstream amenity.

18. The supply-chain characteristic-vectors minimizing system of claim 17, wherein the processing unit is configured to:
associate the set of upstream physical characteristic-vectors with the upstream energy amount; and
associate the set of downstream physical characteristic-vectors with the downstream energy amount.

19. The supply-chain characteristic-vectors minimizing system of claim 16, wherein the set of upstream physical parameters comprises:
a location of an amenity site of the upstream amenity; and
a volumetric flow rate, and a pressure at which the upstream energy amount is transmitted to the downstream amenity.

20. The supply-chain characteristic-vectors minimizing system of claim 16, wherein the set of downstream physical parameters comprises:
a location of an amenity site of the downstream amenity; and
a volumetric flow rate, and a pressure at which the downstream energy amount is received at the downstream amenity.

21. The supply-chain characteristic-vectors minimizing system of claim 14, wherein the set of upstream environmental characteristic-vectors comprises at least one of:
at the upstream amenity:
an atmospheric pressure,
an atmospheric temperature,
a humidity level,
composition of airborne pollutants in atmosphere,
volume of uncontained water in the gas,
volume of uncontained liquid petroleum in the gas, and
a predefined scarred land of an amenity site of the upstream amenity.

22. The supply-chain characteristic-vectors minimizing system of claim 14, wherein the set of downstream environmental characteristic-vectors comprises at least one of:
at the downstream amenity:
an atmospheric pressure,
an atmospheric temperature,
a humidity level,
composition of airborne pollutants in atmosphere,
volume of uncontained water in the gas,
volume of uncontained liquid petroleum in the gas, and
a predefined scarred land of an amenity site of the downstream amenity.

23. The supply-chain characteristic-vectors minimizing system of claim 14, wherein each of the upstream energy amount and the downstream energy amount comprises:
an energy unit associated with a volumetric flow rate of the gas.

24. The supply-chain characteristic-vectors minimizing system of claim 14, further comprising:
a midstream amenity installed between the upstream amenity and the downstream amenity, the midstream amenity comprising:
at least one device comprising any one of:
an energy supply pipeline connecting the upstream amenity and the downstream amenity;
a pre-processing unit connected to the upstream amenity and installed on the energy supply pipeline; and
a receiving unit located in the downstream amenity and connected to the energy supply pipeline.

25. The supply-chain characteristic-vectors minimizing system of claim 24, wherein the processing unit is configured to:
a midstream SCADA system installed at the midstream amenity, wherein the midstream SCADA system:
senses a set of midstream operational parameters with the midstream SCADA system, the set of upstream operational parameters comprising:
a midstream energy amount; and
transmits the set of midstream operational parameters to the remote server.

* * * * *